(12) United States Patent
Sukhija et al.

(10) Patent No.: US 11,556,904 B2
(45) Date of Patent: Jan. 17, 2023

(54) METHOD, SYSTEM, AND COMPUTER PROGRAM PRODUCT FOR PROCESSING A PAYMENT TRANSACTION VIA A PROXY GUARANTOR

(71) Applicant: Visa International Service Association, San Francisco, CA (US)

(72) Inventors: Rohit Sukhija, Bengaluru (IN); Pragathi M S, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 158 days.

(21) Appl. No.: 16/775,656

(22) Filed: Jan. 29, 2020

(65) Prior Publication Data

US 2021/0233041 A1 Jul. 29, 2021

(51) Int. Cl.
G06Q 20/02 (2012.01)
G06Q 20/40 (2012.01)

(52) U.S. Cl.
CPC .......... *G06Q 20/02* (2013.01); *G06Q 20/405* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 10,467,615 B1 * | 11/2019 | Omojola | G06Q 20/02 |
| 10,510,072 B2 * | 12/2019 | Salama | G06Q 20/322 |
| 10,984,411 B1 * | 4/2021 | Hayes | G06Q 20/326 |
| 11,093,937 B2 * | 8/2021 | Lattanzio | G06Q 20/10 |
| 2001/0021925 A1 * | 9/2001 | Ukigawa | G06Q 30/0601 705/39 |
| 2002/0198827 A1 | 12/2002 | van Leeuwen | |
| 2009/0289106 A1 | 11/2009 | Bishop et al. | |
| 2010/0005023 A1 * | 1/2010 | Bayne | G06Q 20/10 705/39 |
| 2012/0324242 A1 | 12/2012 | Kirsch | |
| 2013/0166402 A1 | 6/2013 | Parento et al. | |
| 2014/0040131 A1 | 2/2014 | Andrews et al. | |
| 2014/0279512 A1 | 9/2014 | Dodds-Brown et al. | |

(Continued)

FOREIGN PATENT DOCUMENTS

| | | |
|---|---|---|
| WO | 2011008625 A1 | 1/2011 |
| WO | 2018005635 A3 | 1/2018 |

*Primary Examiner* — Gregory S Cunningham, II
(74) *Attorney, Agent, or Firm* — The Webb Law Firm

(57) ABSTRACT

A method for processing a payment transaction via a proxy guarantor includes: receiving a transaction request between a user and a merchant including payment device data associated with a payment device of the user of a payment type not accepted by the merchant, and an indicator causing the payment transaction to be processed as a proxy guarantor transaction; identifying a guarantor associated with the user having a payment device of a payment type accepted by the merchant; communicating an authorization request to an issuer system associated with the guarantor to cause the issuer system of the guarantor to authorize the payment transaction; receiving an authorization response from the issuer system of the guarantor, the authorization response including a payment transaction approval indicator; and communicating a settlement request to an issuer system of the user.

20 Claims, 14 Drawing Sheets

(56) References Cited

U.S. PATENT DOCUMENTS

| | | | |
|---|---|---|---|
| 2015/0120551 A1* | 4/2015 | Jung | G06Q 20/389 |
| | | | 705/44 |
| 2015/0324766 A1* | 11/2015 | Park | G06Q 20/352 |
| | | | 705/39 |
| 2017/0186006 A1 | 6/2017 | Das | |
| 2017/0200158 A1 | 7/2017 | Honey et al. | |
| 2017/0364914 A1* | 12/2017 | Howard | G06Q 20/405 |
| 2018/0082284 A1* | 3/2018 | Gomes | G06Q 20/36 |
| 2019/0080401 A1 | 3/2019 | Fomukong | |
| 2019/0096002 A1 | 3/2019 | Kharma et al. | |
| 2021/0004896 A1 | 1/2021 | Gannon | |
| 2021/0042734 A1* | 2/2021 | Malhotra | G06Q 20/367 |
| 2021/0233041 A1 | 7/2021 | Sukhija et al. | |

* cited by examiner

40

Proxy Check-Out Form

32 { User Name: John Smith

42 { User Payment Device PAN: 1234567891011111
PIN Number: 4321
Expiration Date: 01/2020

44 { Guarantor Name: Jane Smith
Guarantor Contact Information:
Phone Number: (650) 987-6543
Email Address jane.smith@email.com

[Submit]

FIG. 3

METHOD, SYSTEM, AND COMPUTER PROGRAM PRODUCT FOR PROCESSING A PAYMENT TRANSACTION VIA A PROXY GUARANTOR

BACKGROUND

1. Technical Field

The disclosure relates to processing payment transactions and, in some non-limiting embodiments or aspects, to a method, system, and computer program product for processing payment transactions via a proxy guarantor.

2. Technical Considerations

Certain merchants, including certain merchants selling goods and/or services via a merchant website, only accept certain payment types. This restriction presents a problem for many users that may be capable of initiating payment transactions using certain payment types but not using the payment types accepted by the merchant, as these users lack a payment device capable in initiating a payment transaction with the merchant. Existing systems do not provide an efficient solution that enables users to nonetheless conduct payment transactions with these merchants using alternative payment types not accepted by the merchant.

SUMMARY

According to some non-limiting embodiments or aspects, a method for processing a payment transaction via a proxy guarantor includes: receiving, with at least one processor, a transaction request associated with a payment transaction between a user and a merchant for a transaction amount, the transaction request including: payment device data associated with a payment device of the user, the payment device associated with a payment type not accepted by the merchant; and an indicator causing the payment transaction to be processed as a proxy guarantor transaction; identifying, with at least one processor, at least one guarantor associated with the user, where the at least one guarantor is associated with a payment device associated with a payment type accepted by the merchant; communicating, with at least one processor, an authorization request to an issuer system associated with the payment device of the guarantor to cause the issuer system associated with the payment device of the guarantor to authorize the payment transaction; receiving, with at least one processor, an authorization response from the issuer system associated with the payment device of the guarantor, the authorization response including a payment transaction approval indicator; and communicating, with at least one processor, a settlement request to an issuer system associated with the payment device of the user.

In some non-limiting embodiments or aspects, the method may further include: receiving, with at least one processor, a settlement response from the issuer system associated with the payment device of the user, where the settlement response includes a payment decline indicator; and in response to receiving the settlement response, communicating, with at least one processor, a second settlement request to the issuer system associated with the payment device of the guarantor. The method may further include: receiving, with at least one processor, a settlement response from the issuer system associated with the payment device of the user, where the settlement response includes a payment approval indicator; and in response to receiving the settlement response, foregoing communicating for the payment transaction any settlement request to the issuer system associated with the payment device of the guarantor. The method may further include: prior to receipt of the transaction request, receiving, with at least one processor, at least one guarantor on-boarding request including guarantor data associated with a guarantor; and based on the guarantor on-boarding request, associating, with at least one processor, the guarantor with a user; and storing, with at least one processor, the guarantor data in association with the user in a guarantor database. Identifying at least one guarantor associated with the user may include: communicating, with at least one processor, a guarantor selection request including at least one guarantor associated with the user to a computing device associated with the user; and receiving, with at least one processor, a guarantor selection response identifying at least one guarantor associated with the user to be used for processing the proxy guarantor transaction. The guarantor selection response may identify a plurality of guarantors associated with the user to be used for processing the proxy guarantor transaction. The method may further include: in response to receiving the guarantor selection response, communicating, with at least one processor, an approval request to a computing device associated with the at least one guarantor; and receiving, with at least one processor, an approval response including an acceptance indicator, where the authorization request is communicated to the issuer system associated with the payment device of the guarantor in response to receiving the acceptance indicator.

According to some non-limiting embodiments or aspects, a system for processing a payment transaction via a proxy guarantor includes at least one processor programmed or configured to: receive a transaction request associated with a payment transaction between a user and a merchant for a transaction amount, the transaction request including: payment device data associated with a payment device of the user, the payment device associated with a payment type not accepted by the merchant; and an indicator causing the payment transaction to be processed as a proxy guarantor transaction; identify at least one guarantor associated with the user, where the at least one guarantor is associated with a payment device associated with a payment type accepted by the merchant; communicate an authorization request to an issuer system associated with the payment device of the guarantor to cause the issuer system associated with the payment device of the guarantor to authorize the payment transaction; receive an authorization response from the issuer system associated with the payment device of the guarantor, the authorization response including a payment transaction approval indicator; and communicate a settlement request to an issuer system associated with the payment device of the user.

In some non-limiting embodiments or aspects, the at least one processor may be programmed or configured to: receive a settlement response from the issuer system associated with the payment device of the user, where the settlement response includes a payment decline indicator; and in response to receiving the settlement response, communicate a second settlement request to the issuer system associated with the payment device of the guarantor. The at least one processor may be programmed or configured to: receive a settlement response from the issuer system associated with the payment device of the user, where the settlement response includes a payment approval indicator; and in response to receiving the settlement response, forego communicating for the payment transaction any settlement request to the issuer system associated with the payment device of the guarantor. The at least one processor may be programmed or configured to: prior to receipt of the transaction request, receive at least one guarantor on-boarding request including guarantor data associated with a guarantor; and based on the guarantor on-boarding request, associate the guarantor with a user; and store the guarantor data in association with the user in a guarantor database. Identifying at least one guarantor associated with the user may include: communicating, with at least one processor, a guarantor selection request including at least one guarantor associated with the user to a computing device associated with the user; and receiving, with at least one processor, a guarantor selection response identifying at least one guarantor associated with the user to be used for processing the proxy guarantor transaction. The guarantor selection response may identify a plurality of guarantors associated with the user to be used for processing the proxy guarantor transaction. The at least one processor may be programmed or configured to: in response to receiving the guarantor selection response, communicate an approval request to a computing device associated with the at least one guarantor; and receive an approval response including an acceptance indicator, where the authorization request is communicated to the issuer system associated with the payment device of the guarantor in response to receiving the acceptance indicator.

According to some non-limiting embodiments or aspects, a computer program product for processing a payment transaction via a proxy guarantor includes at least one non-transitory computer-readable medium including one or more instructions that, when executed by at least one processor, cause the at least one processor to: receive a transaction request associated with a payment transaction between a user and a merchant for a transaction amount, the transaction request including: payment device data associated with a payment device of the user, the payment device associated with a payment type not accepted by the merchant; and an indicator causing the payment transaction to be processed as a proxy guarantor transaction; identify at least one guarantor associated with the user, where the at least one guarantor is associated with a payment device associated with a payment type accepted by the merchant; communicate an authorization request to an issuer system associated with the payment device of the guarantor to cause the issuer system associated with the payment device of the guarantor to authorize the payment transaction; receive an authorization response from the issuer system associated with the payment device of the guarantor, the authorization response including a payment transaction approval indicator; and communicate a settlement request to an issuer system associated with the payment device of the user.

In some non-limiting embodiments or aspects, the one or more instructions may cause the at least one processor to: receive a settlement response from the issuer system associated with the payment device of the user, where the settlement response includes a payment decline indicator; and in response to receiving the settlement response, communicate a second settlement request to the issuer system associated with the payment device of the guarantor. The one or more instructions may cause the at least one processor to: receive a settlement response from the issuer system associated with the payment device of the user, where the settlement response includes a payment approval indicator; and in response to receiving the settlement response, forego communicating for the payment transaction any settlement request to the issuer system associated with the payment device of the guarantor. The one or more instructions may cause the at least one processor to: prior to receipt of the transaction request, receive at least one guarantor on-boarding request including guarantor data associated with a guarantor; and based on the guarantor on-boarding request, associate the guarantor with a user; and store the guarantor data in association with the user in a guarantor database. Identifying at least one guarantor associated with the user may include: communicating, with at least one processor, a guarantor selection request including at least one guarantor associated with the user to a computing device associated with the user; and receiving, with at least one processor, a guarantor selection response identifying at least one guarantor associated with the user to be used for processing the proxy guarantor transaction. The guarantor selection response may identify a plurality of guarantors associated with the user to be used for processing the proxy guarantor transaction. The one or more instructions may cause the at least one processor to: in response to receiving the guarantor selection response, communicate an approval request to a computing device associated with the at least one guarantor; and receive an approval response including an acceptance indicator, where the authorization request is communicated to the issuer system associated with the payment device of the guarantor in response to receiving the acceptance indicator.

Further embodiments or aspects are set forth in the following numbered clauses:

Clause 1: A method for processing a payment transaction via a proxy guarantor, comprising: receiving, with at least one processor, a transaction request associated with a payment transaction between a user and a merchant for a transaction amount, the transaction request comprising: payment device data associated with a payment device of the user, the payment device associated with a payment type not accepted by the merchant; and an indicator causing the payment transaction to be processed as a proxy guarantor transaction; identifying, with at least one processor, at least one guarantor associated with the user, wherein the at least one guarantor is associated with a payment device associated with a payment type accepted by the merchant; communicating, with at least one processor, an authorization request to an issuer system associated with the payment device of the guarantor to cause the issuer system associated with the payment device of the guarantor to authorize the payment transaction; receiving, with at least one processor, an authorization response from the issuer system associated with the payment device of the guarantor, the authorization response comprising a payment transaction approval indicator; and communicating, with at least one processor, a settlement request to an issuer system associated with the payment device of the user.

Clause 2: The method of clause 1, further comprising: receiving, with at least one processor, a settlement response from the issuer system associated with the payment device of the user, wherein the settlement response comprises a payment decline indicator; and in response to receiving the settlement response, communicating, with at least one processor, a second settlement request to the issuer system associated with the payment device of the guarantor.

Clause 3: The method of clause 1 or 2, further comprising: receiving, with at least one processor, a settlement response from the issuer system associated with the payment device of the user, wherein the settlement response comprises a payment approval indicator; and in response to receiving the settlement response, foregoing communicating for the payment transaction any settlement request to the issuer system associated with the payment device of the guarantor.

Clause 4: The method of any of clauses 1-3, further comprising: prior to receipt of the transaction request, receiving, with at least one processor, at least one guarantor on-boarding request comprising guarantor data associated with a guarantor; and based on the guarantor on-boarding request, associating, with at least one processor, the guarantor with a user; and storing, with at least one processor, the guarantor data in association with the user in a guarantor database.

Clause 5: The method of any of clauses 1-4, wherein identifying at least one guarantor associated with the user comprises: communicating, with at least one processor, a guarantor selection request comprising at least one guarantor associated with the user to a computing device associated with the user; and receiving, with at least one processor, a guarantor selection response identifying at least one guarantor associated with the user to be used for processing the proxy guarantor transaction.

Clause 6: The method of any of clauses 1-5, wherein the guarantor selection response identifies a plurality of guarantors associated with the user to be used for processing the proxy guarantor transaction.

Clause 7: The method of any of clauses 1-6, further comprising: in response to receiving the guarantor selection response, communicating, with at least one processor, an approval request to a computing device associated with the at least one guarantor; and receiving, with at least one processor, an approval response comprising an acceptance indicator, wherein the authorization request is communicated to the issuer system associated with the payment device of the guarantor in response to receiving the acceptance indicator.

Clause 8: A system for processing a payment transaction via a proxy guarantor, comprising at least one processor programmed or configured to: receive a transaction request associated with a payment transaction between a user and a merchant for a transaction amount, the transaction request comprising: payment device data associated with a payment device of the user, the payment device associated with a payment type not accepted by the merchant; and an indicator causing the payment transaction to be processed as a proxy guarantor transaction; identify at least one guarantor associated with the user, wherein the at least one guarantor is associated with a payment device associated with a payment type accepted by the merchant; communicate an authorization request to an issuer system associated with the payment device of the guarantor to cause the issuer system associated with the payment device of the guarantor to authorize the payment transaction; receive an authorization response from the issuer system associated with the payment device of the guarantor, the authorization response comprising a payment transaction approval indicator; and communicate a settlement request to an issuer system associated with the payment device of the user.

Clause 9: The system of clause 8, wherein the at least one processor is programmed or configured to: receive a settlement response from the issuer system associated with the payment device of the user, wherein the settlement response comprises a payment decline indicator; and in response to receiving the settlement response, communicate a second settlement request to the issuer system associated with the payment device of the guarantor.

Clause 10: The system of clause 8 or 9, wherein the at least one processor is programmed or configured to: receive a settlement response from the issuer system associated with the payment device of the user, wherein the settlement response comprises a payment approval indicator; and in response to receiving the settlement response, forego communicating for the payment transaction any settlement request to the issuer system associated with the payment device of the guarantor.

Clause 11: The system of any of clauses 8-10, wherein the at least one processor is programmed or configured to: prior to receipt of the transaction request, receive at least one guarantor on-boarding request comprising guarantor data associated with a guarantor; and based on the guarantor on-boarding request, associate the guarantor with a user; and store the guarantor data in association with the user in a guarantor database.

Clause 12: The system of any of clauses 8-11, wherein identifying at least one guarantor associated with the user comprises: communicating, with at least one processor, a guarantor selection request comprising at least one guarantor associated with the user to a computing device associated with the user; and receiving, with at least one processor, a guarantor selection response identifying at least one guarantor associated with the user to be used for processing the proxy guarantor transaction.

Clause 13: The system of any of clauses 8-12, wherein the guarantor selection response identifies a plurality of guarantors associated with the user to be used for processing the proxy guarantor transaction.

Clause 14: The system of any of clauses 8-13, wherein the at least one processor is programmed or configured to: in response to receiving the guarantor selection response, communicate an approval request to a computing device associated with the at least one guarantor; and receive an approval response comprising an acceptance indicator, wherein the authorization request is communicated to the issuer system associated with the payment device of the guarantor in response to receiving the acceptance indicator.

Clause 15: A computer program product for processing a payment transaction via a proxy guarantor, the computer program product comprising at least one non-transitory computer-readable medium including one or more instructions that, when executed by at least one processor, cause the at least one processor to: receive a transaction request associated with a payment transaction between a user and a merchant for a transaction amount, the transaction request comprising: payment device data associated with a payment device of the user, the payment device associated with a payment type not accepted by the merchant; and an indicator causing the payment transaction to be processed as a proxy guarantor transaction; identify at least one guarantor associated with the user, wherein the at least one guarantor is associated with a payment device associated with a payment type accepted by the merchant; communicate an authorization request to an issuer system associated with the payment device of the guarantor to cause the issuer system associated with the payment device of the guarantor to authorize the payment transaction; receive an authorization response from the issuer system associated with the payment device of the guarantor, the authorization response comprising a payment transaction approval indicator; and communicate a settlement request to an issuer system associated with the payment device of the user.

Clause 16: The computer program product of clause 15, wherein the one or more instructions cause the at least one processor to: receive a settlement response from the issuer system associated with the payment device of the user, wherein the settlement response comprises a payment decline indicator; and in response to receiving the settlement response, communicate a second settlement request to the issuer system associated with the payment device of the guarantor.

Clause 17: The computer program product of clause 15 or 16, wherein the one or more instructions cause the at least one processor to: receive a settlement response from the issuer system associated with the payment device of the user, wherein the settlement response comprises a payment approval indicator; and in response to receiving the settlement response, forego communicating for the payment transaction any settlement request to the issuer system associated with the payment device of the guarantor.

Clause 18: The computer program product of any of clauses 15-17, wherein the one or more instructions cause the at least one processor to: prior to receipt of the transaction request, receive at least one guarantor on-boarding request comprising guarantor data associated with a guarantor; and based on the guarantor on-boarding request, associate the guarantor with a user; and store the guarantor data in association with the user in a guarantor database.

Clause 19: The computer program product of any of clauses 15-18, wherein identifying at least one guarantor associated with the user comprises: communicating, with at least one processor, a guarantor selection request comprising at least one guarantor associated with the user to a computing device associated with the user; and receiving, with at least one processor, a guarantor selection response identifying at least one guarantor associated with the user to be used for processing the proxy guarantor transaction.

Clause 20: The computer program product of any of clauses 15-19, wherein the guarantor selection response identifies a plurality of guarantors associated with the user to be used for processing the proxy guarantor transaction.

Clause 21: The computer program product of any of clauses 15-20, wherein the one or more instructions cause the at least one processor to: in response to receiving the guarantor selection response, communicate an approval request to a computing device associated with the at least one guarantor; and receive an approval response comprising an acceptance indicator, wherein the authorization request is communicated to the issuer system associated with the payment device of the guarantor in response to receiving the acceptance indicator.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details of the disclosure are explained in greater detail below with reference to the non-limiting exemplary embodiments that are illustrated in the accompanying schematic figures, in which:

FIG. 3 shows a graphical user interface of a proxy check-out interface on a merchant website according to some non-limiting embodiments or aspects;

DETAILED DESCRIPTION

Figure 1:
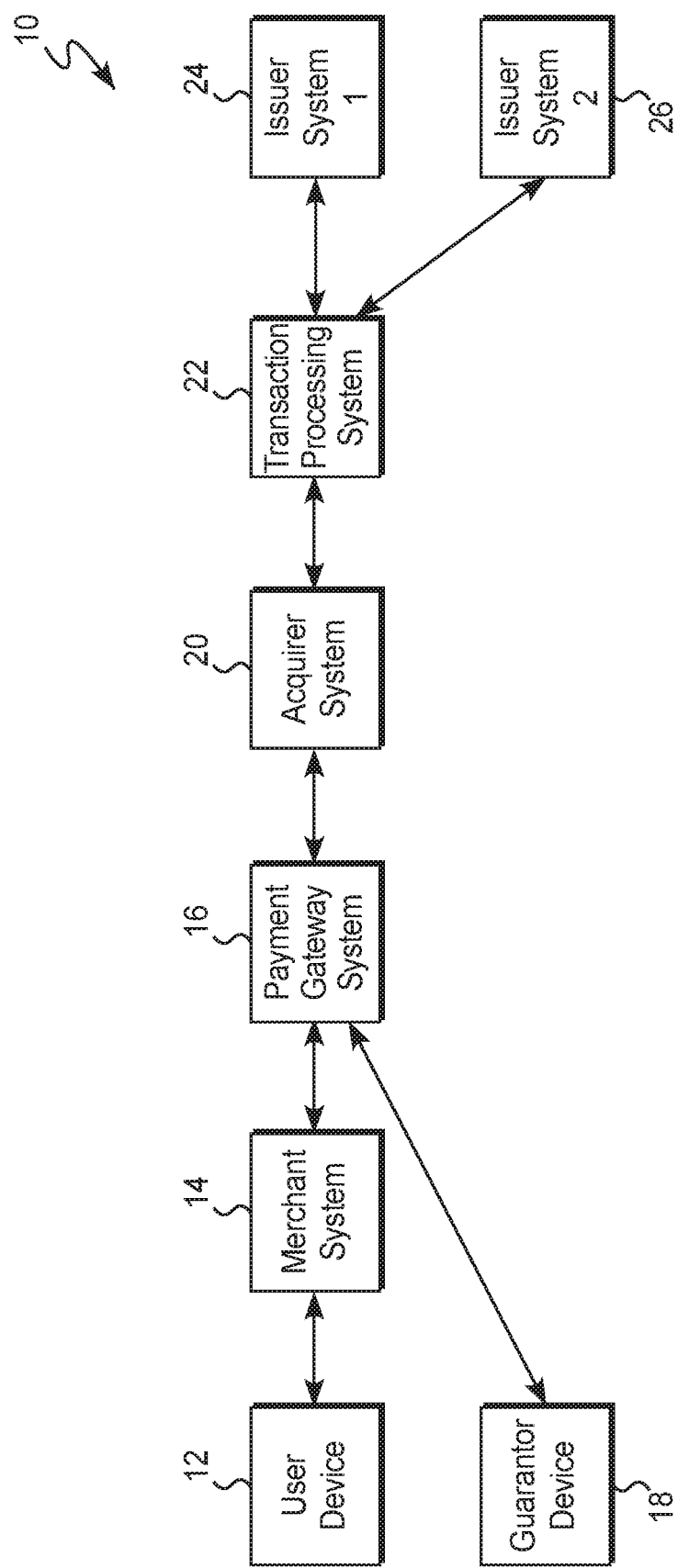
FIG. 1 shows a schematic view of a system for processing a payment transaction via a proxy guarantor according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

The term "account data," as used herein, refers to any data concerning one or more accounts for one or more users. Account data may include, for example, one or more account identifiers, user identifiers, transaction histories, balances, credit limits, issuer institution identifiers, and/or the like.

As used herein, the term "account identifier" may include one or more types of identifiers associated with a user account (e.g., a primary account number (PAN), a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a payment device (e.g., a portable payment instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the term "card-present transaction" may refer to a payment transaction initiated with a payment device in which the cardholder physically presents the payment device at the time the payment transaction is initiated with the payment device. A non-limiting example of a card-present transaction is a payment transaction initiated at a brick-and-mortar retail store with a physical POS system, during which the cardholder physically presents the payment device to the merchant.

As used herein, the term "card-not-present transaction" or "CNP transaction" may refer to a payment transaction initiated with a payment device in which the cardholder does not or cannot physically present the payment device at the time the payment transaction is initiated with the payment device. Non-limiting examples of CNP transactions include transactions initiated by mail, facsimile, or over the telephone or the internet.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account data, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." As used herein, the term "server" or "processor" may refer to one or more devices that provide a functionality to one or more devices (e.g., one or more client devices) via a network (e.g., a public network, a private network, the Internet, and/or the like). For example, a server may include one or more computing devices. As used herein, the term "system" may refer to one or more devices, such as one or more processors, servers, client devices, computing devices that include software applications, and/or the like. In some non-limiting embodiments or aspects, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a method, system, and computer program product for processing a payment transaction via a proxy guarantor. Non-limiting embodiments or aspects enable a user without a payment device of a type accepted by a merchant to nonetheless initiate payment transactions using their payment device. By providing a proxy guarantor who does have a payment device of a type accepted by the merchant, the user is enabled to initiate the payment transaction using their payment device and to have the payment account associated with that payment device be the account from which funds are transferred for the transaction amount during settlement. Non-limiting embodiments or aspects enable the payment transaction to be authorized using the payment device of the guarantor but be settled using the payment device (and account associated therewith) of the user. The user may identify a plurality of guarantors associated with the user prior to initiation of the payment transaction and may select one or more guarantors during processing of the payment transaction to be used for processing thereof. Non-limiting embodiments or aspects of the disclosure utilize an unconventional message sent to a guarantor device during processing of the payment transaction which enables the guarantor to view details of the payment transaction and accept the payment transaction as the guarantor. Various transaction messages communicated between the systems described herein engaging to process the payment transaction may be modified to contain an indicator that the payment transaction is being processed as a proxy guarantor payment transactions (also referred to interchangeably herein as "proxy payment transaction" or "proxy transaction"), where the indicator causes the payment transaction to be processed via a proxy guarantor payment transaction protocol (also referred to herein as "proxy transaction protocol"). Non-limiting embodiments or aspects enable a hold to be placed on the guarantor's payment account associated with its payment device during processing of the payment transaction, which allows for a first settlement attempt to process the transaction using the payment account associated with the payment device of the user. With this unconventional arrangement, a payment type may be used to pay the transaction amount, even with a merchant that does not accept that payment type, resulting in streamlined and efficient transaction process. In response to successfully processing the payment transaction using the user's payment account, the hold placed on the guarantor's payment account may be removed. Non-limiting embodiments or aspects enable the payment account of the guarantor to be used for the payment transaction if processing with the payment account of the user fails.

Referring to FIG. 1, a system 10 for processing payment transactions via a proxy guarantor according to some non-limiting embodiments or aspects is shown. The system 10 may include a user device 12 associated with a user (e.g. a consumer) in communication with a merchant system 14 (e.g., merchant POS system) operated by or on behalf of a merchant providing goods and/or services. The user device 12 may communicate with the merchant system 14 to initiate a payment transaction between the user and the merchant. The user device 12 may include a computing device capable of initiating a payment transaction with the merchant system 12. In some non-limiting embodiments or aspects, the user may initiate the payment transaction with the merchant system 14 by physically presenting a payment device to the merchant. The payment device may include payment device data associated with the payment device of the user associated with a payment account to be used to process the payment transaction, such as an account identifier (e.g., a PAN), a card verification value (CVV) code, a PIN number, an expiration date, and/or the like. The payment transaction may be a card-present transaction or a card-not-present transaction (e.g., initiated via a merchant website or a merchant application).

Referring to FIGS. 1-4, the payment transaction may be a payment via proxy transaction executed according to a proxy transaction protocol. In some non-limiting embodiments or aspects, the merchant may only accept payment devices of a certain type. For example, the merchant may only accept payment devices of the type associated with credit accounts to initiate payment transactions and/or the merchant may not accept payment devices of the type associated with a debit account (or vice versa). For example, the merchant may only accept payment devices of the type associated with a certain transaction service provider (e.g., accepting Visa® payment devices but not payment devices from other transaction service providers). Other type differentiations between payment devices are also contemplated herein. The proxy transaction protocol allows for a user that does not have a payment device of a type accepted by the merchant to initiate a payment transaction with such a merchant using their payment device and a guarantor who has a payment device of a type accepted by the merchant.

Figure 2:
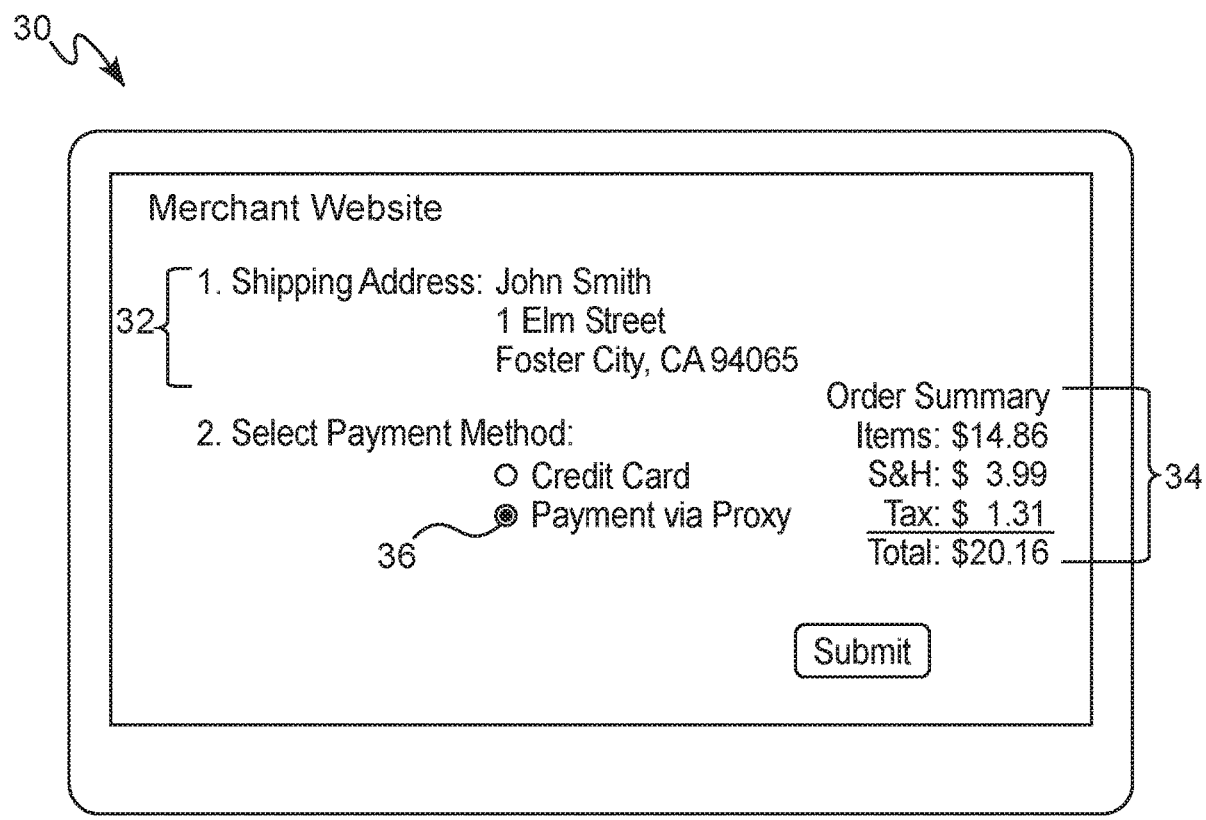
FIG. 2 shows a graphical user interface of a merchant website payment interface according to some non-limiting embodiments or aspects.

Referring to FIG. 2, during initiation of the payment transaction, the user may indicate that the payment transaction is a payment via proxy transaction to cause the system 10 (from FIG. 1) to process the payment transaction according to the proxy transaction protocol. In some non-limiting embodiments or aspects, during initiation of the payment transaction the user may be prompted to select a payment method. FIG. 2 shows a non-limiting example in which the user initiating a payment transaction on a merchant website (or a merchant application or a user interface of a merchant POS device, as other non-limiting examples) is prompted to select a payment method on a check-out user interface 30. The check-out user interface 30 may include user data 32 associated with the user, such as user name, user contact data (e.g., residential address, shipping address, telephone number, fax number, email address, social media handle, and the like), and/or the like. The check-out user interface 30 may include order data 34 associated with the order associated with the payment transaction. The order data 34 may include merchant data (e.g., merchant name, merchant contact data, merchant category code, and the like), prices associated with goods and/or services of the merchant, shipping and handling, tax, total price, data associated with the goods (e.g., type of goods, name of goods, UPC code associated with goods, quantity of goods, and the like), and the like. The check-out user interface 30 may include a selectable option 36 to allow the user to indicate (e.g., via the user device 12 and/or a merchant POS device and/or the like) that the payment transaction is to be processed as a payment via proxy transaction. The arrangement of the check-out user interface 30 enabling the user to initiate a payment via proxy transaction shown in FIG. 2 is exemplary only and may take many different forms.

Referring to FIG. 3, in some non-limiting embodiments or aspects, in response to the user selecting the payment via proxy selectable option 36 on the check-out user interface 30 (FIG. 2), the user device 12 or other computing device (e.g., merchant POS device) may display a proxy check-out interface 40. The proxy check-out interface 40 may display at least a portion of the user data 32. The proxy check-out interface 40 may enable a user to provide payment device data 42 associated with the payment device of the user of a type not accepted by the merchant (e.g., a debit card in this non-limiting example). The proxy check-out interface 40 may enable a user to provide guarantor data 44. The guarantor data 44 may be any data capable of identifying a guarantor associated with a payment device accepted by the merchant (e.g., a credit card in this non-limiting example). The guarantor data 44 may include guarantor name, guarantor contact data (e.g., residential address, telephone number, fax number, email address, social media handle, and/or the like), and/or the like. In some non-limiting embodiments or aspects, the proxy check-out interface 40 may enable a user to provide payment device data associated with the payment device of the guarantor, the payment device of a type accepted by the merchant. The user may submit the data provided to the proxy check-out interface 40 to initiate the payment transaction.

In some non-limiting embodiments or aspects, in order to process the payment transaction as a proxy transaction, the user may be prompted to authenticate his/her identity using an authentication method. The authentication method may include a two-factor authentication method, such as a one-time password (OTP) two-factor authentication process. The authentication of the user may ensure that the proxy transaction is not being fraudulently initiated.

Referring again to FIG. 1, in response to the payment transaction being initiated between a user and a merchant, the merchant system 14 may generate a message (hereinafter a "transaction request") and communicate the transaction request to a payment gateway system 16 operated by or on behalf of a payment gateway associated with the merchant. The transaction request may include the payment device data associated with the payment device of the user. The transaction request may also include the guarantor data identifying the guarantor and/or the payment device of the guarantor. The transaction request may include other data for processing the payment transaction according to the proxy transaction protocol. The transaction request may include an indicator indicating that the payment transaction is a proxy transaction which causes the transaction to be processed according to the proxy transaction protocol.

In some non-limiting embodiments or aspects, in response to receiving the transaction request, the payment gateway system 16 may generate a message (hereinafter a "guarantor request") and communicate the guarantor request to a guarantor device 18 associated with the guarantor. The guarantor may be the individual or entity specified by the user, and the guarantor request may be communicated to the guarantor device 18 using the contact data provided by the user. The guarantor device 18 may be a computing device. The guarantor request may be based on the guarantor data in the transaction request. The non-limiting example of FIG. 1 shows the payment gateway system 16 generating and communicating the guarantor request and later receiving the guarantor response from the guarantor device 18; however, the guarantor request may be generated and communicated and the guarantor response received by one or more other components of the system 10, such as the merchant system 14, the acquirer system 20, the transaction processing system 22, the issuer system 24 of the user's payment device, the issuer system 26 of the guarantor's payment device, or some combination of these system components.

Figure 4:
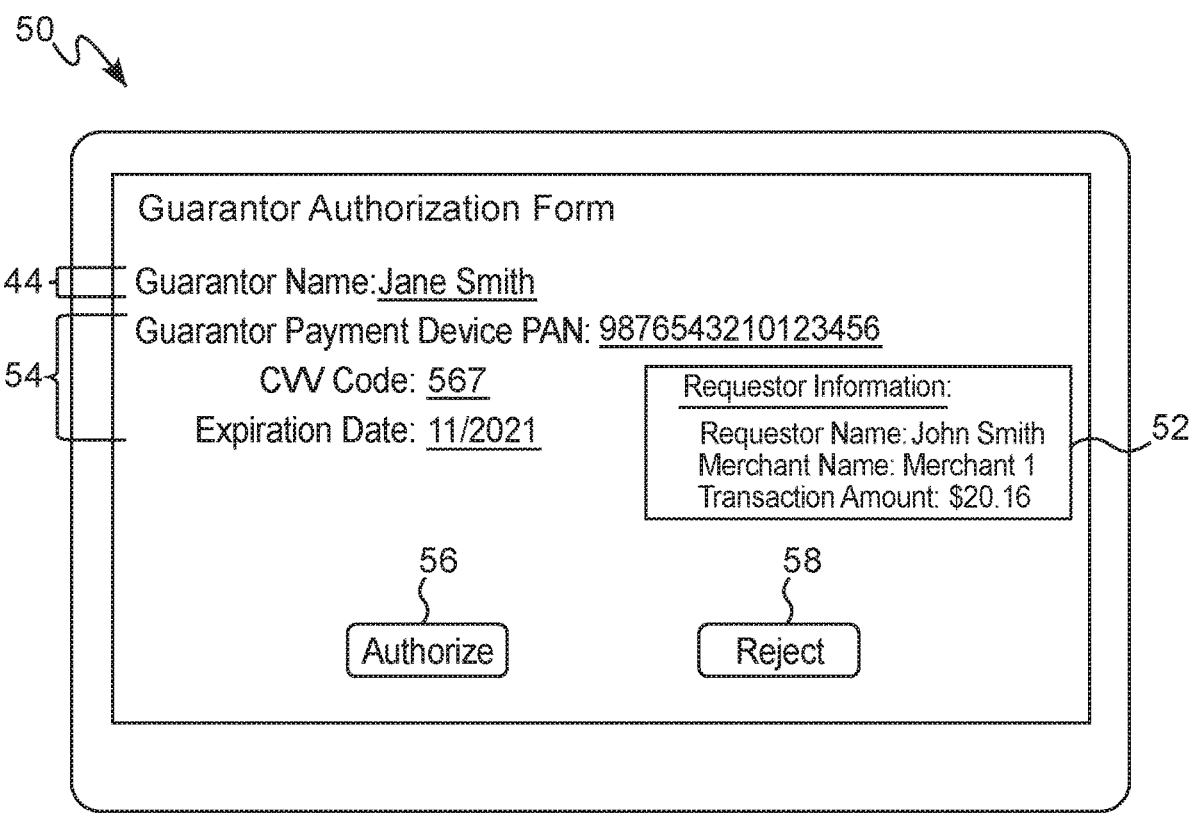
FIG. 4 shows a graphical user interface of a guarantor authorization interface according to some non-limiting embodiments or aspects.

Referring to FIG. 4, the guarantor device 18 may display a guarantor authorization interface 50 in response to receiving the guarantor request. The guarantor authorization interface 50 may display at least a portion of the guarantor data 44 and/or enable the guarantor to provide the guarantor data 44. The guarantor authorization interface may display requestor data 52 associated with the payment transaction. The requestor data may include at least a portion of the user data 32 such that the guarantor is informed as to who is requesting the guarantor for the payment transaction. The requestor data 52 may further include details associated with the payment transaction, such as at least a portion of the order data 34 such that the guarantor is informed about relevant details associated with the payment transaction.

The guarantor authorization interface 50 may enable the guarantor to provide payment device data 54 associated with the payment device of the guarantor. The payment device data 54 may include an account identifier (e.g., PAN) associated with the payment device, a CVV code, an expiration date, and/or the like. The payment device data 54 may include data to be used to process a payment transaction using a payment device of a type held by the guarantor.

The guarantor authorization interface 50 may include an authorization option 56 to authorize use of the guarantor's payment device to conduct the payment transaction as a proxy transaction and initiate further processing according to the proxy transaction protocol. The guarantor authorization interface 50 may include a reject option 58 to reject use of the guarantor's payment device to conduct the payment transaction as a proxy transaction and terminate further processing according to the proxy transaction protocol.

Referring FIGS. 1 and 4, in some non-limiting embodiments or aspects, the guarantor selecting the reject option 58 may cause the guarantor device 18 to generate and communicate a message (hereinafter a "guarantor response") to the payment gateway system 16. The guarantor response may include an indicator that the guarantor rejected processing of the payment transaction according to the proxy transaction protocol and may cause the payment transaction to be terminated. The payment gateway system 16 may communicate a notification message to the merchant system 14 and/or the user device 12 that the guarantor rejected the payment transaction such that the payment transaction has been terminated.

Referring FIGS. 1 and 4, in some non-limiting embodiments or aspects, the guarantor providing the payment device data 54 and selecting the authorization option 56 may cause the guarantor device 18 to generate and communicate a message (hereinafter a "guarantor response") to the payment gateway system 16. The guarantor response may include the payment device data 54 associated with the payment device of the guarantor. The guarantor response may include an indicator that the guarantor authorized processing of the payment transaction according to the proxy transaction protocol.

In some non-limiting embodiments or aspects, in order to process the payment transaction as a proxy transaction, the guarantor may be prompted to authenticate his/her identity using an authentication method. The authentication method may include a two-factor authentication method, such as a one-time password (OTP) two-factor authentication process. The authentication of the guarantor may ensure that the proxy transaction is not being fraudulently initiated.

With continued reference to FIG. 1, in response to the guarantor response including an authorization to continue processing the proxy transaction, the payment gateway system 16 may generate and communicate a message (hereinafter "processing message") to cause an acquirer system 20 operated by or on behalf of an acquirer associated with the merchant, a transaction processing system 22 operated by or on behalf of a transaction service provider associated with the user and/or the guarantor's payment device, an issuer system 24 operated by or on behalf of an issuer of the user's payment device, and/or an issuer system 26 operated by or on behalf of an issuer of the guarantor's payment device to process the proxy transaction according to the proxy transaction protocol.

The processing message may comprise a hold request to be communicated to the issuer system 26 associated with the guarantor's payment device to cause the issuer system 26 to place a hold on the account of the guarantor for a transaction amount associated with the payment transaction, as hereinafter described. The hold request may comprise a requested duration of the hold on the guarantor's account. In some non-limiting embodiments or aspects, upon expiration of the duration of the hold, the hold may be automatically removed. In some non-limiting embodiments or aspects, upon expiration of the duration of the hold, the system 10 may process the proxy payment transaction using the account of the guarantor. The processing message may comprise an authorization request to cause the issuer system 24 of the user's payment device and/or the issuer system 26 of the guarantor's payment device to determine an authorization decision associated with the payment transaction, as hereinafter described. The processing message may comprise an indicator that the payment transaction is a proxy transaction to be processed according to the proxy transaction protocol. The indicator may be included in a data field of the processing message.

With continued reference to FIG. 1, the payment gateway system 16 may communicate the processing message to the relevant acquirer system 20 associated with the merchant. The acquirer system 20 may generate and communicate a message (hereinafter "second processing message") to the relevant transaction processing system 22. The transaction processing system 22 may be the transaction processing system associated with the user's payment device and/or the transaction processing system associated with the guarantor's payment device. In some non-limiting embodiments, the user's payment device and the guarantor's payment device may be associated with the same transaction processing system or separate transaction processing systems. The second processing message may include at least a portion of the processing message. The second processing message may comprise an indicator that the payment transaction is a proxy transaction to be processed according to the proxy transaction protocol.

With continued reference to FIG. 1, the transaction processing system 22 may communicate a message (hereinafter "hold request") to the issuer system 26 of the guarantor's payment device. The hold request may cause the issuer system 26 of the guarantor's payment device to place a hold on the guarantor's account for at least a portion of the transaction amount. The hold request may comprise an indicator that the payment transaction is a proxy transaction to be processed according to the proxy transaction protocol. In some non-limiting embodiments or aspects, the hold request may cause the issuer system 26 of the guarantor's payment device (e.g., of a type accepted by the merchant) to determine an initial authorization decision (also an example of an alternate authorization decision, as described below) associated with the payment transaction for the transaction amount. The initial authorization decision may be to approve the transaction, to decline the transaction, and/or to approve the transaction at least in part. In some non-limiting embodiments, a decline authorization decision or at least a partial decline may result in termination of the processing of the payment transaction. In some non-limiting embodiments, an approve authorization decision may result in the proxy payment transaction being permitted to process to completion (e.g., authorization, clearing, and settlement). In some non-limiting embodiments, an initial authorization decision is not determined by the issuer system 26 of the guarantor's payment device in response to the hold request.

The issuer system 26 of the guarantor's payment device may communicate a message (hereinafter "hold response") to the transaction processing system 22, generated in response to the hold being placed on the account of the guarantor. The hold response may include an indication that the hold has been placed on the guarantor's account for at least a portion of the transaction amount. The hold response may include the initial authorization decision.

With continued reference to FIG. 1, in response to receiving the hold response and/or in parallel with the communication of the hold request, the transaction processing system 22 may communicate a message (hereinafter "authorization request") to the issuer system 24 of the user's payment device. The authorization request may comprise an indicator that the payment transaction is a proxy transaction to be processed according to the proxy transaction protocol. The authorization request may cause the issuer system 24 of the user's payment device (e.g., of a type not accepted by the merchant) to determine an authorization decision associated with the payment transaction for the transaction amount. The authorization decision may be to approve the transaction, to decline the transaction, and/or to approve the transaction at least in part. The issuer system 24 of the user's payment device may communicate a message (hereinafter "authorization response") to the transaction processing system 22. The authorization response may include the authorization decision. The transaction processing system 22 may continue processing the proxy transaction according to the proxy transaction protocol based on the authorization response.

In response to the issuer system 24 of the user's payment device approving the payment transaction for the transaction amount, the transaction processing system 22 may continue processing the payment transaction using the user's payment device. The transaction processing system 22 may generate and communicate a message (hereinafter "hold removal message") to the issuer system 26 of the guarantor's payment device to cause the issuer system 26 of the guarantor's payment device to remove the hold on the guarantor's account for the portion of the transaction amount. The transaction processing system 22 may cause the funds for the transaction amount to be transferred from the user's account and/or an account of the issuer associated with the user and transferred to an account of the merchant to settle the payment transaction.

In response to the issuer system 24 of the user's payment device declining the payment transaction for the transaction amount, the transaction processing system 22 may continue processing the payment transaction using the guarantor's payment device. The transaction processing system 22 may communicate a message (hereinafter "alternate authorization message") to the issuer system 26 of the guarantor's payment device to cause the issuer system 26 of the guarantor's payment device to determine an alternate authorization decision for the transaction amount of the payment transaction. The alternate authorization decision may be to approve the transaction, to decline the transaction, and/or to approve the transaction at least in part. The issuer system 26 of the guarantor's payment device may communicate a message (hereinafter "alternate authorization response") to the transaction processing system 22. The alternate authorization response may include the alternate authorization decision. In response to the alternate authorization decision to approve the payment transaction, the transaction processing system 22 may cause the funds for the transaction amount to be transferred from an account associated with the guarantor (e.g., an account of the guarantor's issuer and/or the guarantor's account) to an account of the merchant to settle the payment transaction.

In some non-limiting embodiments or aspects, the transaction processing system 22 may cause the funds for the transaction amount to be transferred from an account associated with the guarantor (e.g., an account of the guarantor's issuer and/or the guarantor's account) to an account of the merchant to settle the payment transaction without the alternate authorization message and alternate authorization response being communicated between the transaction processing system 22 and the issuer system 26 of the guarantor's payment device. This may occur in response to the initial authorization decision approving the transaction constituting the alternate authorization decision of the issuer system 26 of the guarantor's payment device. In this way, the issuer system 26 of the guarantor's payment device may pre-authorize the payment transaction for the transaction amount before the authorization request is sent to the issuer system 24 of the user's payment device in response to the issuer system 24 of the user's payment device declining the payment transaction.

In response to the issuer system 24 of the user's payment device approving the payment transaction for only a portion of the transaction amount, the transaction processing system 22 may continue processing the payment transaction using the user's payment device for a portion of the transaction amount and using the guarantor's payment device for a remainder of the transaction amount. The transaction processing system 22 may generate and communicate the hold removal message to the issuer system 26 of the guarantor's payment device to cause the issuer system 26 of the guarantor's payment device to remove the hold on the guarantor's account for the portion of the transaction amount to be covered by the user's payment device. The transaction processing system 22 may cause the funds for the transaction amount to be covered by the user's payment device to be transferred from the user's account and/or an account of the issuer associated with the user and transferred to an account of the merchant to settle the payment transaction. The remainder of the transaction amount may be covered by the guarantor's account as previously described, such that the transaction processing system 22 may cause the funds for the remainder of the transaction amount to be covered by the guarantor's payment device to be transferred from the account associated with the guarantor (e.g., an account of the guarantor's issuer and/or the guarantor's account) to an account of the merchant to settle the payment transaction.

With continued reference to FIG. 1, the transaction processing system 22 may communicate a message (hereinafter "processing response") to the acquirer system 20. The processing response may contain data associated with the processing of the payment transaction. The processing response may contain the authorization decision of the issuer system 24 of the user's payment device and/or the authorization decision of the issuer system 26 of the guarantor's payment device. The processing response may contain data identifying or that can be used to determine whether the payment transaction was completed using the user's payment device, the guarantor's payment device, or some combination of the user's and guarantor's payment devices.

With continued reference to FIG. 1, the acquirer system 20 may communicate a message (hereinafter "second processing response") to the payment gateway system 16. The second processing response may include at least a portion of the processing response. The payment gateway system 16 may communicate a notification message to the merchant system 14, the user device 12, and/or the guarantor device 18 that may include at least a portion of the processing response to notify the merchant, the guarantor, and/or the user as to how the proxy transaction is being processed to completion, including settlement.

With continued reference to FIG. 1, in the non-limiting example of the system 10 for processing payment transactions via a proxy guarantor, the payment gateway system 16, the acquirer system 20, and the transaction processing system 22 are shown. In some non-limiting embodiments or aspects, any function described as being performed by one of the payment gateway system 16, the acquirer system 20, and/or the transaction processing system 22 may alternatively be performed by another of these components. Moreover, in some non-limiting embodiments or aspects, one of the payment gateway system 16, the acquirer system 20, and the transaction processing system 22 may be omitted from the system and the functionality associated with such omitted components may be performed by the other of the components not omitted. In some non-limiting embodiments or aspects, the acquirer system 20 and the payment gateway system 16 may be omitted, such that the transaction processing system 22 performs the functions described as being associated with the acquirer system 20 and the payment gateway system 16.

Figure 5:
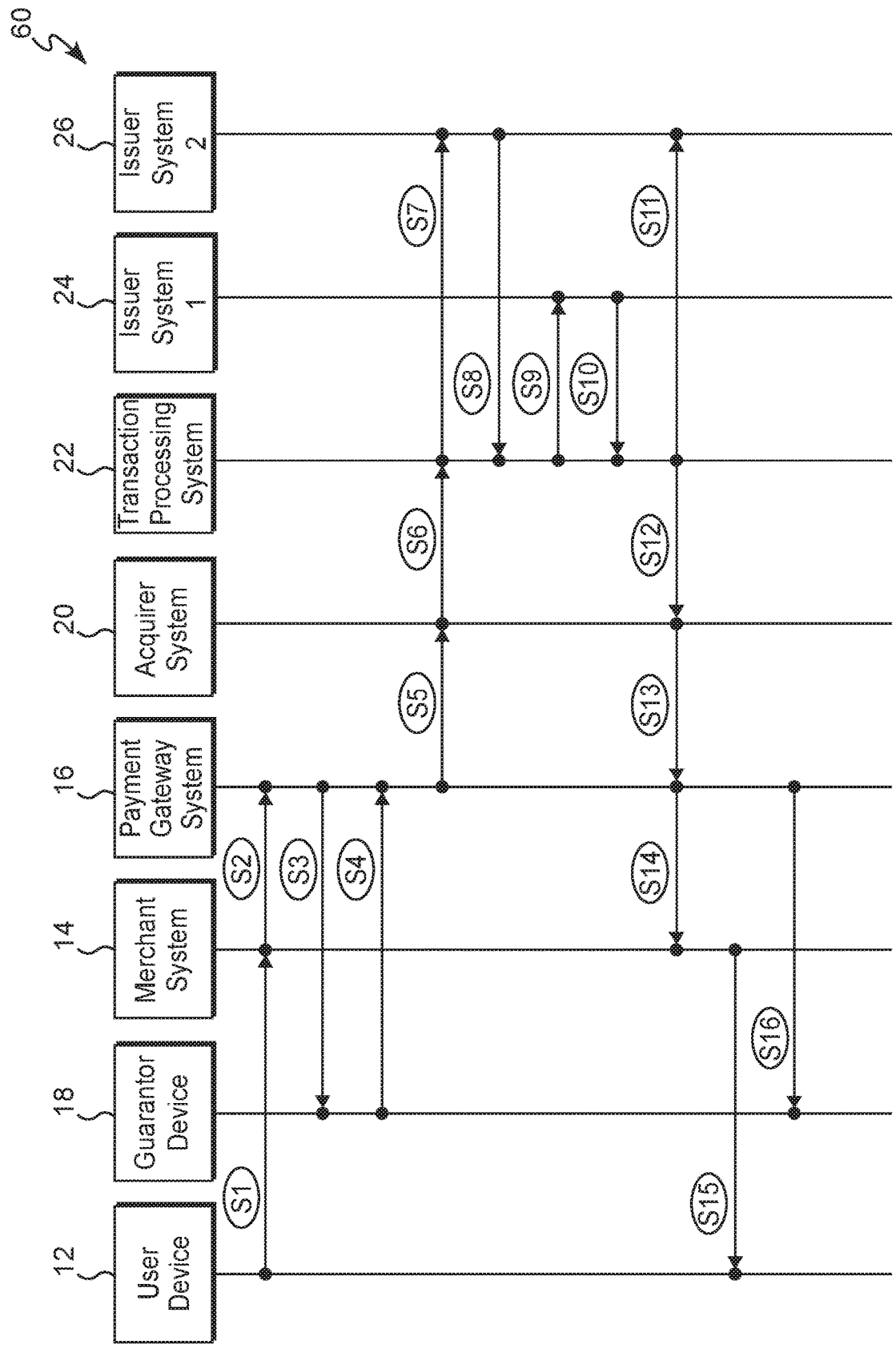
FIG. 5 shows a process flow diagram of a method for processing a payment transaction via a proxy guarantor according to some non-limiting embodiments or aspects.

Referring to FIG. 5, a method 60 for processing a payment transaction via a proxy guarantor using the user's payment device according to some non-limiting embodiments or aspects is shown. At a step S1, the user device 12 may initiate a proxy guarantor payment transaction with the merchant system 14 by providing a payment device of the user having stored thereon payment device data associated with a payment device of a type not accepted by the merchant (e.g., a debit card in this non-limiting example). The user may specify guarantor data identifying a guarantor having a payment device of a type accepted by the merchant (e.g., a credit card in this non-limiting example) for processing the proxy payment transaction to initiate the proxy payment transaction with the merchant system 14. At a step S2, the merchant system 14 may generate and communicate the transaction request to the payment gateway system 16.

At a step S3, the payment gateway system 16 may generate and communicate the guarantor request to the guarantor device 18. At a step S4, the guarantor device 18 may generate and communicate the guarantor response to the payment gateway system 16, and the guarantor response may include payment device data associated with the credit account of the guarantor.

At a step S5, the payment gateway system 16 may communicate the processing message to the acquirer system 20. At a step S6, the acquirer system 20 may communicate the second processing message to the transaction processing system 22.

At a step S7, the transaction processing system may communicate the hold request to the issuer system 26 of the guarantor payment device to cause the issuer system 26 of the guarantor payment device to place a hold on the guarantor's credit account for at least a portion of the transaction amount. At a step S8, the issuer system 26 of the guarantor payment device may place the hold on the guarantor's credit account for the portion of the transaction amount and may generate and communicate the hold response to the transaction processing system 22.

At a step S9, the transaction processing system 22 may communicate the authorization request to the issuer system 24 of the user's payment device to cause the issuer system 24 of the user's payment device to determine an authorization decision associated with the proxy payment transaction. At a step S10, the issuer system 24 of the user's payment device may determine that the authorization decision is to approve the proxy payment transaction for the transaction amount and generate and communicate the authorization response to the transaction processing system 22 including the approval authorization decision.

At a step S11, the transaction processing system 22 may communicate the hold removal message to the issuer system 26 of the guarantor payment device to cause the issuer system 26 of the guarantor payment device to remove the hold from the guarantor's credit account for the portion of the transaction amount.

At a step S12, the transaction processing system 22 may communicate the processing response to the acquirer system 20. At a step S13, the acquirer system 20 may communicate the second processing response to the payment gateway system 16.

At a step S14, the payment gateway system 16 may communicate a message to the merchant system 14 to notify the merchant system 14 that the proxy payment transaction has been approved. The message may notify the merchant system 14 that the proxy payment transaction is being processed using the user's debit account.

At a step S15, the merchant system 14 may communicate a message to the user device 12 to notify the user device 12 that the proxy payment transaction has been approved. The message may notify the user device 12 that the proxy payment transaction is being processed using the user's debit account. The payment gateway system 16 may notify the user device 12 via the merchant system 14 in some non-limiting embodiments or aspects.

At a step S16, the payment gateway system 16 may communicate a message to the guarantor device 18 to notify the guarantor device 18 that the proxy payment transaction has been approved. The message may notify the guarantor device 18 that the proxy payment transaction is being processed using the user's debit account.

Figure 6:
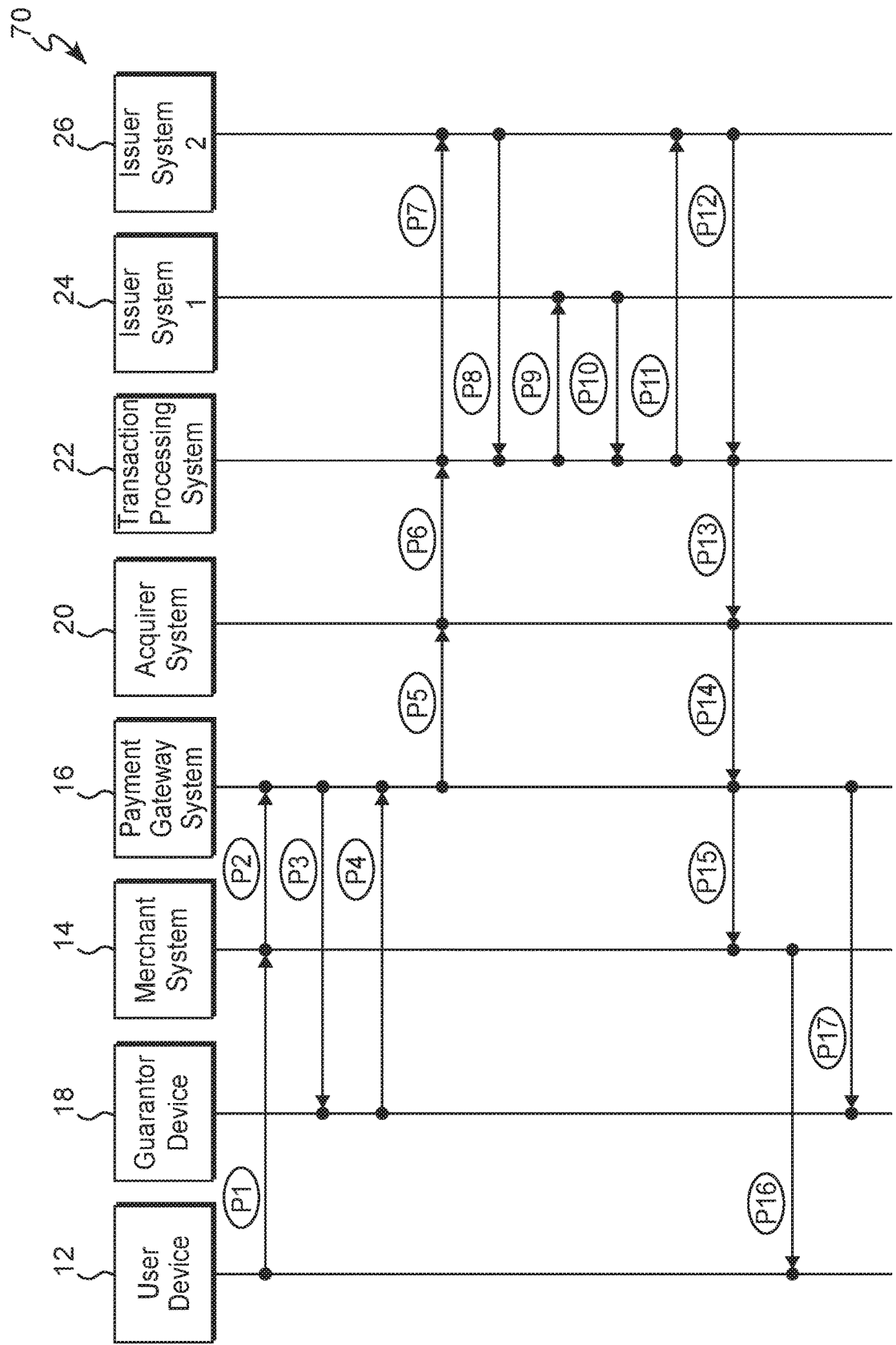
FIG. 6 shows a process flow diagram of a method for processing a payment transaction via a proxy guarantor according to some non-limiting embodiments or aspects.

Referring to FIG. 6, a method 70 for processing a payment transaction via a proxy guarantor using the guarantor's payment device according to some non-limiting embodiments or aspects is shown. With respect to steps P1-P9, each steps is identical to each of steps S1-S9, respectively, described in connection with FIG. 5.

At a step P10, the issuer system 24 of the user's payment device may determine the authorization decision is to decline the proxy payment transaction for the transaction amount and generate and communicate the authorization response to the transaction processing system 22 including the decline authorization decision. The decline authorization decision may be based on the user's debit account not having sufficient funds to cover the transaction amount.

At a step P11, the transaction processing system 22 may communicate the alternate authorization message to the issuer system 26 of the guarantor payment device to cause the issuer system 26 of the guarantor payment device to determine an authorization decision associated with the proxy payment transaction. At a step P12, the issuer system 26 of the guarantor's payment device may determine the authorization decision is to approve the proxy payment transaction for the transaction amount and generate and communicate the alternate authorization response to the transaction processing system 22 including the approval authorization decision. In some non-limiting embodiments or aspects, steps P11 and P12 may be performed before and/or after the issuer system 24 of the user's payment device determines its authorization decision is to decline the proxy payment transaction (in steps P9-P10). In some non-limiting embodiments or aspects, steps P11 and P12 may be performed simultaneously with steps P7 and P8.

At a step P13, the transaction processing system 22 may communicate the processing response to the acquirer system 20. At a step P14, the acquirer system 20 may communicate the second processing response to the payment gateway system 16.

At a step P15, the payment gateway system 16 may communicate a message to the merchant system 14 to notify the merchant system 14 that the proxy payment transaction has been approved. The message may notify the merchant system 14 that the proxy payment transaction is being processed using the guarantor's credit account.

At a step P16, the merchant system 14 may communicate a message to the user device 12 to notify the user device 12 that the proxy payment transaction has been approved. The message may notify the user device 12 that the proxy payment transaction is being processed using the guarantor's credit account. The payment gateway system 16 may notify the user device 12 via the merchant system 14 in some non-limiting embodiments or aspects.

At a step P17, the payment gateway system 16 may communicate a message to the guarantor device 18 to notify the guarantor device 18 that the proxy payment transaction has been approved. The message may notify the guarantor device 18 that the proxy payment transaction is being processed using the guarantor's credit account.

Figure 7:
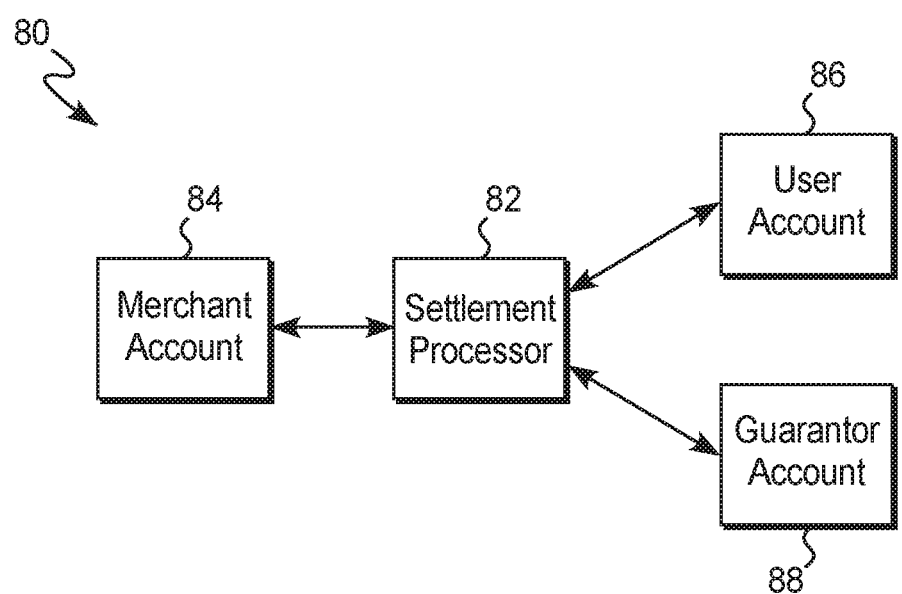
FIG. 7 shows a schematic view of a system for settling a payment transaction initiated using a proxy guarantor according to some non-limiting embodiments or aspects.

Referring to FIG. 7, a system 80 for settling a payment transaction initiated using a proxy guarantor according to some non-limiting embodiments or aspects is shown. The system 80 may include a settlement processor 82 operated by or on behalf of at least one of the payment gateway, the acquirer, the transaction service provider, and the issuer of the payment device of the user and/or the guarantor. In some non-limiting embodiments or aspects, the settlement processor 82 may be in communication with and/or a component of at least one of the payment gateway system 16, acquirer system 20, the transaction processing system 22, the issuer system 24 of the user's payment device, and the issuer system 26 of the guarantor's payment device and receive a message from at least one of the systems to cause the settlement processor 82 to settle the proxy payment transaction. In some non-limiting embodiments or aspects, at least one of the merchant system 14, the payment gateway system 16, and the acquirer system 20 may communicate a settlement file to the settlement processor 82 (directly or indirectly) to cause the proxy payment transaction to be settled according to the proxy transaction protocol.

The settlement processor 82 may be in communication with a merchant account 84 associated with the merchant in the proxy payment transaction, a user account 86 associated with the user (e.g., an account of the user and/or an issuer associated with the user) in the proxy payment transaction, and/or a guarantor account 88 associated with the guarantor (e.g., an account of the guarantor and/or an issuer associated with the guarantor) in the proxy payment transaction so as to be enabled to transfer funds to and and/or from the merchant account 84, the user account 86, and/or the guarantor account 88 to effect a fund transfer (e.g., to settle the proxy payment transaction).

With continued reference to FIG. 7, in some non-limiting embodiments or aspects in which the proxy payment transaction is to be processed using the user's payment device, the settlement processor 82 may communicate with the user account 86 and the merchant account 84 to transfer funds for the transaction amount from the user account 86 to the merchant account 84 to settle the payment transaction. In some non-limiting embodiments or aspects in which the proxy payment transaction is to be processed using the guarantor's payment device, the settlement processor 82 may communicate with the guarantor account 88 and the merchant account 84 to transfer funds for the transaction amount from the guarantor account 88 to the merchant account 84 to settle the payment transaction. In some non-limiting embodiments or aspects in which the proxy payment transaction is to be processed using the user's payment device for a portion of the transaction amount and the guarantor's payment device for the remainder of the transaction amount, the settlement processor 82 may communicate with the user account 86, the guarantor account 88, and the merchant account 84 to transfer funds for the portion of the transaction amount from the user account 86 to the merchant account 84 and for the remainder of the transaction amount from the guarantor account 88 to the merchant account 84 to settle the payment transaction.

With continued reference to FIG. 7, in some non-limiting embodiments or aspects, the settlement processor 82 may transfer an additional proxy transaction processing fee (beyond the transaction amount) from the user account 86 to at least one of the guarantor account 88 and the merchant account 84 in response to the user requesting the payment transaction be processed according to the proxy transaction protocol and/or in response to the payment transaction successfully being processed according to the proxy transaction protocol.

Figure 8:
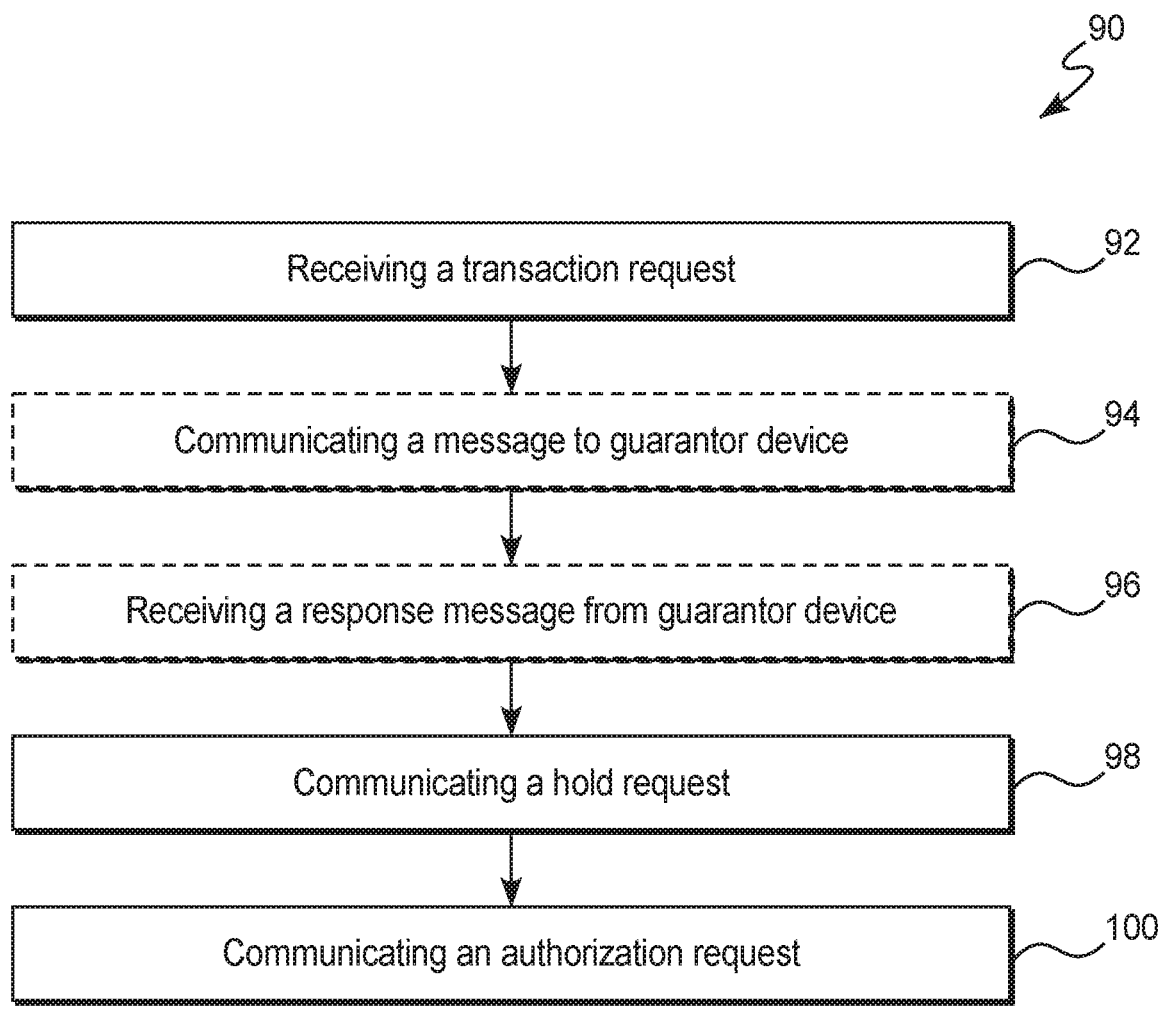
FIG. 8 shows a step diagram of a method for processing a payment transaction via a proxy guarantor according to some non-limiting embodiments or aspects.

Referring to FIG. 8, a method 90 for processing a payment transaction via a proxy guarantor according to some non-limiting embodiments or aspects is shown. At a step 92, the payment gateway system 16, the acquirer system 20, and/or the transaction processing system 22 may receive a transaction request associated with a payment transaction for a transaction amount. The payment transaction may be associated with a user. The transaction request may include payment device data associated with a payment device of the user of the type not accepted by the merchant and guarantor data identifying a guarantor associated with a payment device of a type accepted by the merchant.

At a step 94, the payment gateway system 16, the acquirer system 20, and/or the transaction processing system 22 may communicate a message (the guarantor request) to the guarantor device 18 based on the guarantor data.

At a step 96, the payment gateway system 16, the acquirer system 20, and/or the transaction processing system 22 may receive a response message (the guarantor response) from the guarantor device 18. The guarantor response may include payment device data associated with a payment device associated with the guarantor.

At a step 98, the payment gateway system 16, the acquirer system 20, and/or the transaction processing system 22 may communicate the hold request to the issuer system 26 of the guarantor's payment device to cause the issuer system 26 of the guarantor's payment device to place a hold on the account of the guarantor for at least a portion of the transaction amount.

At a step 100, the payment gateway system 16, the acquirer system 20, and/or the transaction processing system 22 may communicate the authorization request to the issuer system 24 of the user's payment device.

Referring to FIGS. 1, 2, and 9-11, another proxy transaction protocol is shown according to some non-limiting embodiments or aspects.

Figure 9:
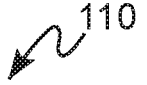
FIG. 9 shows a graphical user interface of a guarantor on-boarding form according to some non-limiting embodiments or aspects.
Figure 10:
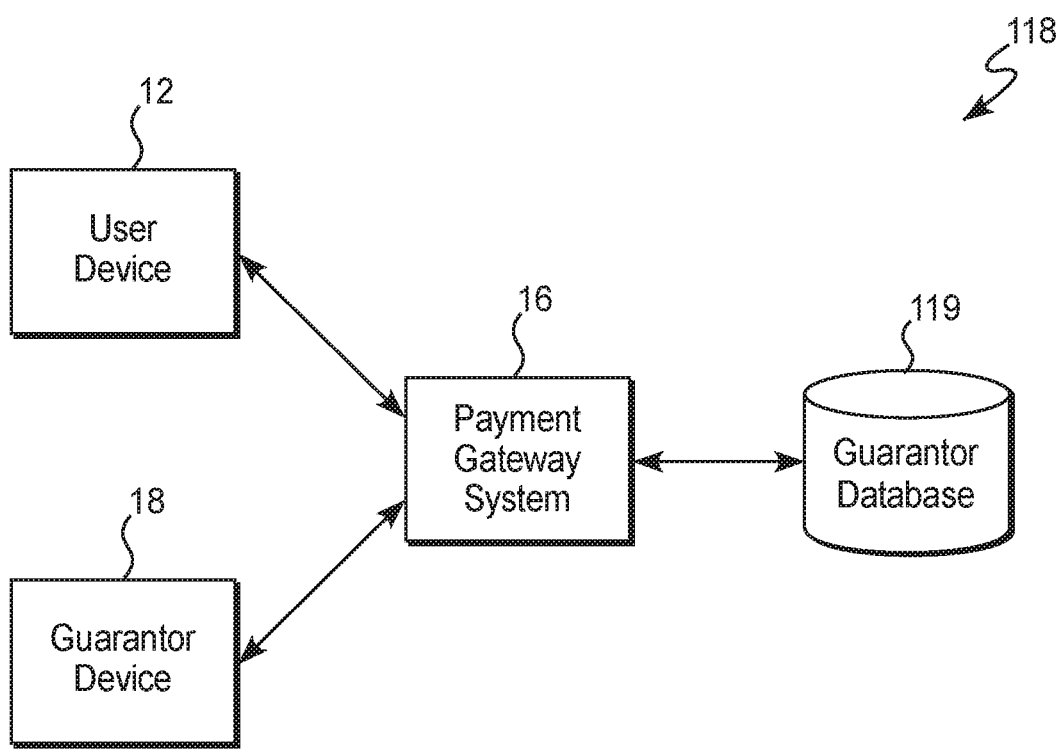
FIG. 10 shows a schematic view of a system for associating guarantors with a user according to some non-limiting embodiments or aspects.

Referring to FIGS. 9 and 10, in some non-limiting embodiments or aspects, prior to or during the user initiating a proxy transaction, at least one guarantor may be associated with the user. A plurality of guarantors may be associated with the user. FIG. 9 shows a graphical user interface 110 of a guarantor on-boarding form according to some non-limiting embodiments or aspects. The guarantor on-boarding form may include user data 112 associated with the user, which may include at least a portion of the user data 32 described in connection with FIGS. 2 and 3. The guarantor on-boarding form may include payment device data 114 associated with the payment device, which may include at least a portion of the payment device data 42 described in connection with FIGS. 2 and 3. The guarantor on-boarding form may include guarantor data 116 capable of identifying a guarantor associated with a payment device accepted by the merchant, which may include at least a portion of the guarantor data 44 described in connection with FIGS. 2 and 3. The guarantor on-boarding form may also include a payment device data associated with payment device of a guarantor, or this payment device data may be later provided by the guarantor device 18.

Referring to FIG. 10, a system 118 is shown for associating guarantors with a user according to some non-limiting embodiments or aspects. The user device 12 may submit the guarantor on-boarding form (from FIG. 9) to the payment gateway system 16 (and/or the merchant system 14, the acquirer system 20, the transaction processing system 22) to cause the guarantor to be associated with the user. The payment gateway system 16 may communicate with the guarantor device 18 associated with the guarantor identified the guarantor on-boarding form to confirm that the guarantor wishes to function as the guarantor for the user. The guarantor device 18 may approve or decline to be guarantor for the user. The guarantor device 18 may communicate payment device data associated with a payment device of a guarantor to the payment gateway system 16 to complete enrollment or association of the guarantor with the user, which payment device data may include at least a portion of the payment device data 54 associated with the payment device of the guarantor described in connection with FIG. 4. The guarantor device 18 may communicate guarantor rules associated with functioning as guarantor for the user to the payment gateway system 16. For example, the guarantor device 18 may communicate rules associated with when and/or how frequently the guarantor will function as guarantor for the user; a single transaction spend limit and/or aggregate spend limit for the guarantor functioning as the guarantor for the user; types of transactions and/or types of goods/services for which the guarantor will function as guarantor for the user; whether the guarantor must approve proxy transactions for the user during processing of the transaction; an amount or percent the guarantor will charge the user for functioning as the guarantor; and the like.

With continued reference to FIG. 10, in response to the guarantor device 18 approving the guarantor being associated with the user, the payment gateway system 16 may communicate with a guarantor database 119 to store the association of the guarantor with the user. The guarantor rules may also be stored in the guarantor database 119 in association with the guarantor and the user. Referring to FIGS. 9 and 10, the user may submit a plurality of guarantor on-boarding forms to associate a plurality of guarantors with the user, each of which is processed as described above and which associations are stored in the guarantor database 119.

Referring to FIGS. 1, 2, and 9-11, the user device 12 may communicate with the merchant system 14 to initiate a payment transaction between the user and the merchant.

In some non-limiting embodiments or aspects the merchant may only accept payment devices of a certain type. In the non-limiting example shown in FIG. 9, the merchant may only accept credit card payments for credit cards associated with certain transaction service providers, and not others or other forms of payment devices (e.g., debit cards, pre-paid cards, and the like).

During initiation of the payment transaction, the user may indicate that the payment transaction is a payment via proxy transaction to cause the payment transaction to be processed according to the proxy transaction protocol. In some non-limiting embodiments or aspects, during initiation of the payment transaction the user may be prompted to select a payment method. FIG. 2 shows a non-limiting example in which the user initiating a payment transaction on a merchant website (or a merchant application or a user interface of a merchant POS device, as other non-limiting examples) is prompted to select a payment method on a check-out user interface 30. The check-out user interface 30 may include a selectable option 36 to allow the user to indicate (e.g., via the user device 12 and/or a merchant POS device and/or the like) that the payment transaction is to be processed as a payment via proxy transaction.

Referring again to FIG. 1, in response to the payment transaction being initiated between the user device 12 and the merchant system 14, the merchant system 14 may generate a transaction request (as previously described) and communicate the transaction request to the payment gateway system 16. The transaction request may include an indicator that the transaction is to be processed as a proxy transaction. Based on the transaction request, the payment gateway system 16 may determine the user associated with the payment transaction and may identify at least one guarantor associated with the user. The payment gateway system 16 may identify the at least one guarantor associated with the user by communicating with the guarantor database 119 (from FIG. 10) to determine the guarantors associated with the user.

Figure 11:
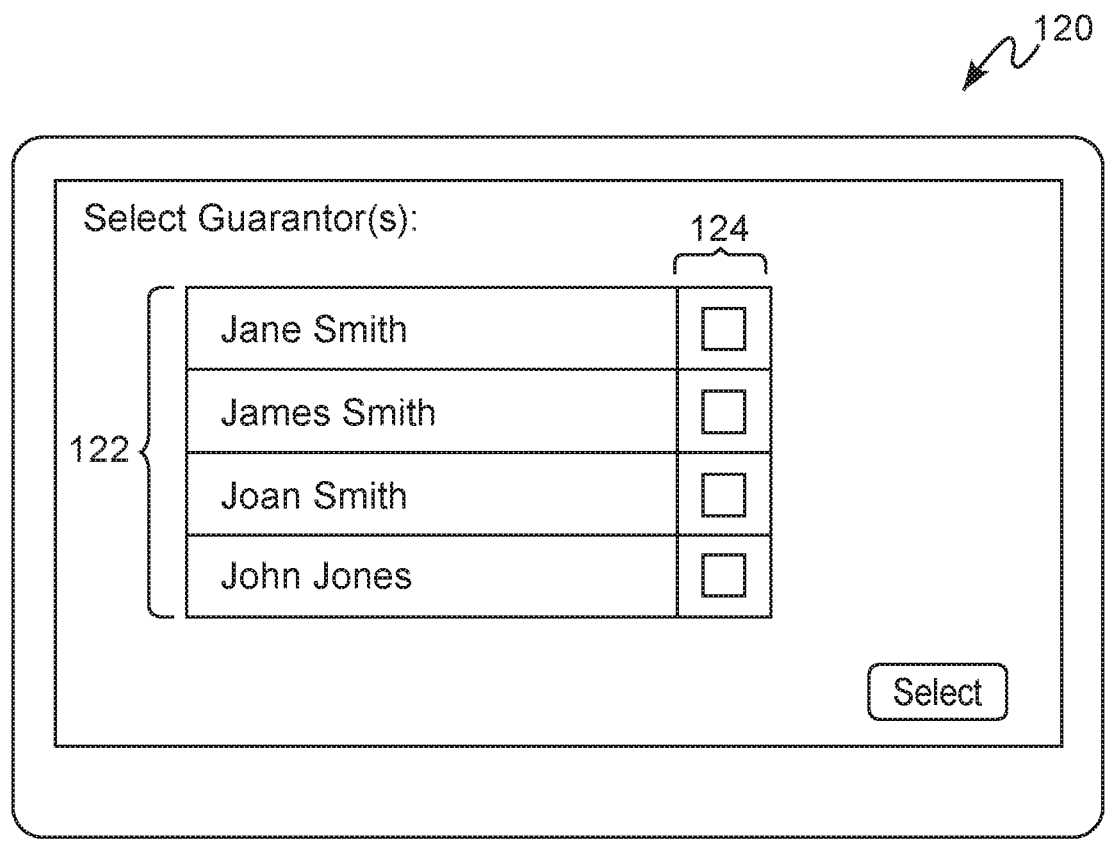
FIG. 11 shows a graphical user interface of a guarantor selection form according to some non-limiting embodiments or aspects.

Referring to FIGS. 1, 10, and 11, the payment gateway system 16 may communicate a guarantor selection request to the user device 12 in response to identifying the at least one guarantor associated with the user. The guarantor selection request may be displayed on a graphical user interface 120 of the user device 12 as shown in FIG. 11. The guarantor selection request may include a list 122 of guarantors associated with the user. The list 122 may include all users associated with the user or some subset thereof. In some non-limiting embodiments or aspects, only guarantors eligible to function as guarantors for the payment transaction may be included in the list 122. This may include guarantors whose guarantor rules permit the guarantor to be a guarantor for the select payment transaction and/or guarantors who have a payment device of the type accepted by the instant merchant. The list 122 of guarantors may be displayed to the user in a predetermined arrangement according to user preferences. The predetermined arrangement may be based on guarantors most frequently used by the user, guarantors used most recently by the user, historical transaction amount for which the guarantor has been a guarantor for the user, personal or family relationship between the user and the guarantor, a risk score associated with the guarantor, and the like.

With continued reference to FIG. 11, the user may select at least one guarantor from the list 122 using a selectable option 124 associated with the guarantor. The user may select a plurality of guarantors to function as guarantor for the payment transaction. The user may select to use a single guarantor for the payment transaction but select multiple guarantors and rank those guarantors, such that if the first ranked guarantor declines to be guarantor or its issuer declines the transaction, the lower ranked guarantors may be used in sequence of the rankings. A plurality of guarantors may be used for a single transaction with each guarantor functioning as guarantor for a certain amount or percent of the transaction; such amounts or percents may be specified by the user in the guarantor selection request.

Referring to FIGS. 1, 10, and 11, the user may submit the guarantor selection to the payment gateway system 16 by the user device 12 communicating a guarantor selection response thereto. As such, the guarantor selection response may include the guarantor(s) selected by the user for use in processing the payment transaction.

In some non-limiting embodiments or aspects, in response to receiving the guarantor selection response, the payment gateway system 16 may communicate an approval request to the guarantor device 18 to cause the guarantor device 18 to approve or decline being used as a guarantor for the user in connection with the payment transaction. The guarantor device 18 may communicate an approval response comprising an acceptance indicator if the guarantor approves being guarantor for the payment transaction. The guarantor device 18 may communicate a denial response comprising a decline indicator if the guarantor declines to be guarantor for the payment transaction. The guarantor rules may determine whether the approval request is to be communicated to the guarantor device 18 or whether the payment transaction may proceed without further approval from the guarantor device 18. The authorization request to further process the transaction may be communicated in response to the payment gateway receiving the acceptance indicator. In response to receiving a denial response, the payment transaction may be terminated or an approval request may be communicated to the guarantor device 18 associated with the next guarantor to be used.

In some non-limiting embodiments or aspects, the above-described guarantor selection process may be performed by the merchant system 14 (instead of or in addition to the payment gateway system 16) communicating with the user device 12 and the guarantor database 119.

Referring again to FIG. 1, in response to receiving the approval response, the payment gateway system 16 may generate and communicate a processing message (as previously described) to cause the acquirer system 20, the transaction processing system 22 associated with the guarantor's payment device, the issuer system 24 of the issuer of the user's payment device, and/or the issuer system 26 of the issuer of the guarantor's payment device to process the proxy transaction according to the proxy transaction protocol.

With continued reference to FIG. 1, the acquirer system 20 may generate and communicate a second processing message (as previously described) to the relevant transaction processing system 22. The transaction processing system 22 may be the transaction processing system associated with the guarantor's payment device.

In some non-limiting embodiments or aspects, the transaction processing system 22 may communicate an authorization request to the issuer system 26 of the guarantor's payment device (e.g., of a type accepted by the merchant) to cause the issuer system 26 of the guarantor's payment device to determine an authorization decision for the payment transaction. If a plurality of guarantors are being used for the payment transaction (e.g., each for a portion of the payment amount), a plurality of authorization requests may be sent to the issuer systems thereof. The authorization decision may be to approve the transaction, to decline the transaction, and/or to approve the transaction at least in part. The issuer system 26 of the guarantor's payment device may communicate an authorization response to the transaction processing system 22, the authorization response including the authorization decision. The issuer system 26 of the guarantor's payment device may place a hold on the guarantor's account or on an account of the issuer associated with the guarantor for the authorized amount, if applicable. In response to the authorization decision being to authorize the payment transaction or to authorize the transaction at least in part, the payment transaction may be processed to completion for the authorized amount. In response to the authorization decision being to decline the payment transaction or to decline the transaction at least in part, the payment transaction may be terminated for the declined amount or another authorization request to another issuer system 26 of the next guarantor payment device to be used may be communicated, which may be repeated until the payment transaction is authorized or the payment transaction is terminated (e.g., because each guarantor issuer system declined the transaction).

The transaction processing system 22, in response to receiving the authorization response, may communicate a processing response to the acquirer system 20, with the processing response including the authorization decision of the issuer system 26 of the guarantor's payment device. The authorization decision may be included by way of an indicator as a data field in the processing response (e.g., an approval indicator, a decline indicator, and/or a partial approval indicator, as applicable). The acquirer system 20 may communicate a second processing message to the payment gateway system 16, which may include at least a portion of the processing response, such as the authorization decision. The payment gateway system 16 may communicate a notification message to at least one of the merchant system 14, the user device, and/or the guarantor device 18 to notify the merchant, the user, and/or the guarantor that the proxy transaction has been authorized and/or will be processed to completion, including a settlement according to the proxy transaction protocol as hereinafter described.

Referring to FIGS. 1 and 7, in some non-limiting embodiments or aspects, the proxy transaction may be settled by the settlement processor 82, which may be a component of the transaction processing system 22 and/or the payment gateway system 16 and/or the acquirer system 20, communicating with at least one of the user account 86, which may be a component of the issuer system 24 of the user's payment device, and/or the guarantor account 88, which may be a component of the issuer system 26 of the guarantor's payment device.

With continued reference to FIGS. 1 and 7, the settlement processor 82 may communicate a settlement request to the user account 86. The settlement processor 82 may communicate the settlement request to the user account 86 before the settlement processor 82 communicates with the guarantor account 88 in connection with the payment transaction. In response to receiving the settlement request, the user account may determine a settlement decision including whether to approve, decline, or approve in part the settlement request. The settlement decision may be based on settlement rules, such as: whether the amount of funds in the user account 86 is sufficient to cover the transaction amount, whether the transaction amount is below a predetermined limit, whether an aggregate sum of recent transactions is below a predetermined limit, whether an aggregate count of transactions is below a predetermined limit, whether a transaction velocity (transactions/unit of time) is below a predetermined limit, and the like.

In some non-limiting embodiments or aspects, the user account 86 may determine a settlement decision to approve the transaction. The user account 86 may communicate a settlement response to the settlement processor 82, and the settlement response may include a payment approval indicator as a data field thereof to indicate that the settlement decision was to approve the transaction. In response to receiving the settlement response including the payment approval indicator, the settlement processor 82 may transfer funds for the transaction amount from the user account 86 to the merchant account 84. As the transaction amount was settled by the user account 86, the settlement processor 82 may forego communicating any settlement request to the guarantor account 88 associated with the payment transaction. The settlement processor 82 may communicate a hold removal to the guarantor account 88 to cause any hold of funds placed thereon during the authorization of the payment transaction to be removed from the guarantor account 88.

In some non-limiting embodiments or aspects, the user account 86 may determine a settlement decision to decline the transaction. The user account 86 may communicate a settlement response to the settlement processor 82, and the settlement response may include a payment decline indicator as a data field thereof to indicate that the settlement decision was to decline the transaction. In response to receiving the settlement response including the payment decline indicator, the settlement processor 82 may communicate a second settlement request to the guarantor account 88. The second settlement request may cause funds to be transferred for the transaction amount from the guarantor account 88 to the merchant account 84. If a plurality of guarantors are being used for the payment transaction, the second settlement request may be sent to each guarantor account 88 to cause the amount associated with each guarantor to be transferred from the various guarantor accounts 88 to the merchant account 84. If a hold was previously placed on the guarantor account(s) 88 for the transaction amount during authorization, the held funds may be transferred from the guarantor account(s) 88 to the merchant account 84.

In some non-limiting embodiments or aspects, the user account 86 may determine a settlement decision to approve in part the transaction. The user account 86 may communicate a settlement response to the settlement processor 82, and the settlement response may include a partial approval indicator as a data field thereof to indicate that the settlement decision was to approve in part the transaction. In response to receiving the settlement response including the partial approval indicator, the settlement processor 82 may transfer funds for the approved portion of the transaction amount (less than the full transaction amount) from the user account 86 to the merchant account 84. In response to receiving the settlement response including the partial approval indicator, the settlement processor 82 may communicate a second settlement request to the guarantor account 88 for the balance of the transaction amount. The second settlement request may cause funds for the balance to be transferred from the guarantor account 88 to the merchant account 84. If a hold was previously placed on the guarantor account(s) 88 for the transaction amount during authorization, the a portion of the held funds for the balance may be transferred from the guarantor account 88 to the merchant account 84, and the hold may be removed for the portion of the transaction amount instead transferred from the user account 86.

Figure 12:
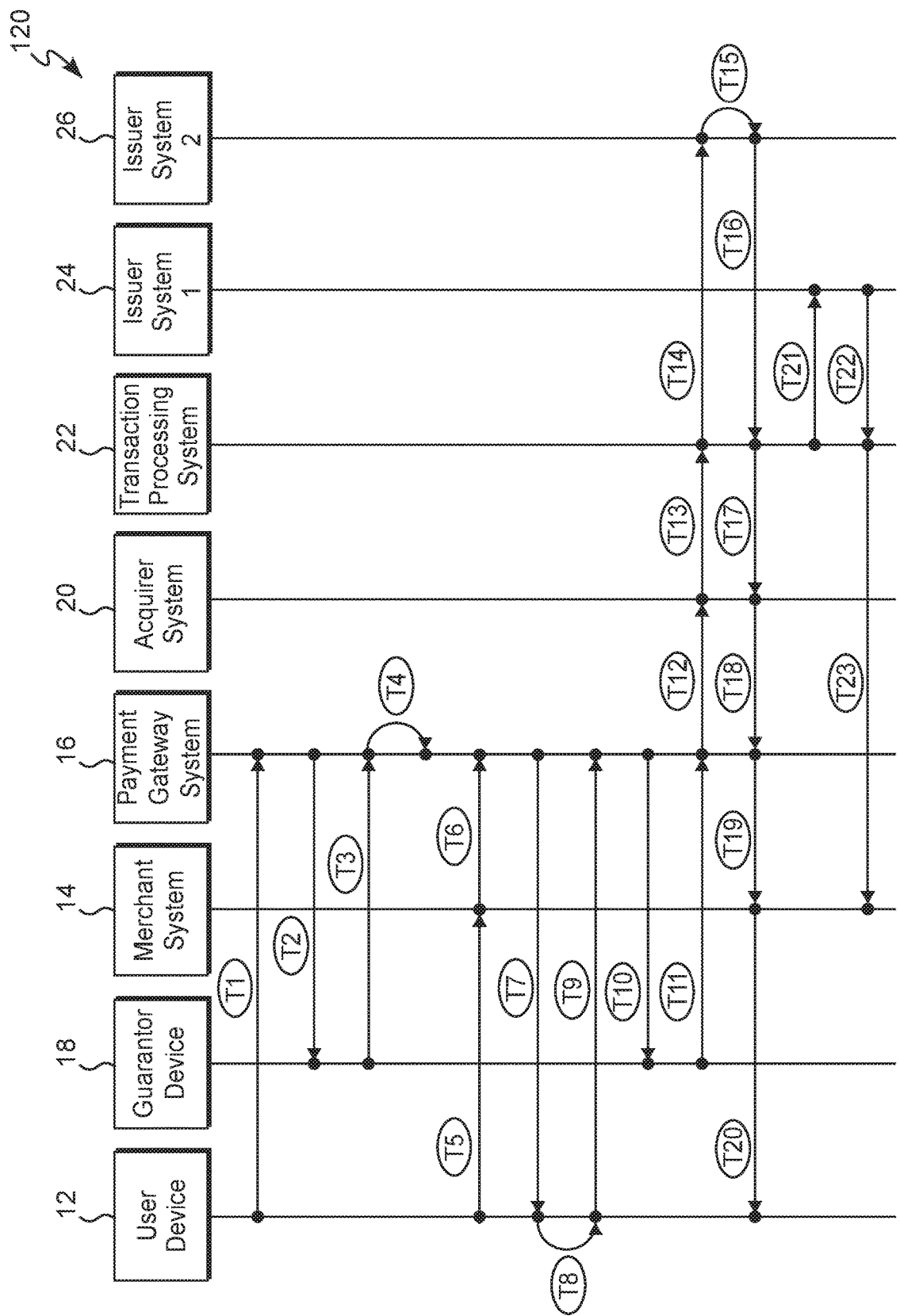
FIG. 12 shows a process flow diagram of a method for processing a payment transaction via a proxy guarantor according to some non-limiting embodiments or aspects.

Referring to FIG. 12, a method 120 for processing a payment transaction via a proxy guarantor using the user's payment account according to some non-limiting embodiments or aspects is shown. At a step T1, the user device 12 may communicate the at least one completed guarantor on-boarding form (from FIG. 9) to the payment gateway system 16 to initiate association of at least one guarantor with the user. The user device 12 may request a plurality of guarantors be associated with the user by submitting the at least one completed guarantor on-boarding form.

With continued reference to FIG. 12, at a step T2, the payment gateway system 16 may communicate with the guarantor device 18 associated with the guarantor identified in the guarantor on-boarding form to confirm that the guarantor wishes to be a guarantor for the user. At a step T3, the guarantor device 18 may communicate with the payment gateway system 16 to approve or decline to be a guarantor for the user and to communicate any guarantor rules associated with functioning as a guarantor for the user. The guarantor device 18 may communicate payment device data associated with the guarantor's payment device to enroll and/or associate of the guarantor with the user. At a step T4, the payment gateway system 16 may store data associating the user with at least one guarantor and any guarantor payment device data and/or guarantor rules associated therewith in the guarantor database 119 (e.g., of the payment gateway system 16). Steps T1-T4 may be performed prior to or during initiation of a proxy payment transaction by the user.

With continued reference to FIG. 12, at a step T5, the user device 12 may communicate with the merchant system 14 to initiate a proxy payment transaction between the user and the merchant. The merchant may not accept payment transactions from a payment device of a type held by the user. At a step T6, the merchant system 14 may generate and communicate the transaction request associated with the proxy payment transaction to the payment gateway system 16 to continue processing of the payment transaction according to the proxy transaction protocol.

At a step T7, the payment gateway system 16 (or in some non-limiting examples the merchant system 14 may perform T7-T11) may identify the user associated with the proxy transaction and communicate with the guarantor database 119 to identify at least one guarantor associated with the user. The payment gateway system 16 may communicate the guarantor selection request including a list of at least one guarantor associated with the user to the user device 12. At a step T8, the user device 12 may select at least one guarantor from the list. The user device 12 may select one or a plurality of guarantors. The guarantors may hold a payment device of a type accepted by the merchant. At a step T9, the user device 12 may communicate to the payment gateway system 16 the guarantor selection response including the selected guarantor(s) to cause the proxy transaction to be processed using the guarantor(s).

In some non-limiting embodiments or aspects, at a step T10, the payment gateway system 16 may communicate an approval request to the guarantor device 18 of the selected guarantor (should the guarantor rules for that guarantor so require) to cause the guarantor device 18 to approve or decline being used as a guarantor for the proxy transaction. At a step T11, the guarantor device 18 may communicate an approval response to the payment gateway system 16 including an acceptance indicator to indicate that the guarantor may be used for the proxy transaction.

With continued reference to FIG. 12, at a step T12, the payment gateway system 16 may generate and communicate the processing message to the acquirer system 20. At a step T13, the acquirer system 20 may generate and communicate the second processing message to the transaction processing system 22 associated with the guarantor's payment device.

With continued reference to FIG. 12, at a step T14, the transaction processing system 22 may communicate the authorization request to the issuer system 26 of the guarantor's payment device. At a step T15, in response to receiving the authorization request, the issuer system 26 of the guarantor's payment device may determine an authorization decision for the proxy transaction. The authorization decision may be to approve, decline, or approve in part the proxy transaction. In this non-limiting example, the authorization decision is to approve the transaction. At a step T16, the issuer system 26 of the guarantor's payment device may generate and communicate the authorization response to the transaction processing system 22, which authorization response may include an approval indicator in a data field thereof to indicate that the authorization decision was to approve of the proxy transaction.

With continued reference to FIG. 12, at a step T17, the transaction processing system 22 may generate and communicate the processing response to the acquirer system 20 including the authorization decision. At a step T18, the acquirer system 20 may generate and communicate the second processing message to the payment gateway system 16 including the authorization decision. At a step T19, the payment gateway system 16 may generate and communicate the notification message to the merchant system 14 to notify the merchant system 14 that the proxy transaction has been authorized. At a step T20, the merchant system 14 may communicate with the user device 12 to notify the user device 12 that the proxy transaction has been authorized.

With continued reference to FIG. 12, to settle the proxy transaction, at a step T21, the transaction processing system 22 may communicate a settlement request to the issuer system 24 of the user's payment device (e.g., the user account thereof). At a step T22, the issuer system 24 of the user's payment device may determine the settlement decision and generate and communicate a settlement response to the transaction processing system 22. In this non-limiting example, the settlement decision is to approve the transaction, such that the settlement response may include a data field including the payment approval indicator. The settlement processor (e.g., of the transaction processing system 22) may transfer funds from the issuer system 24 of the user's payment device (e.g., the user account thereof) to the merchant system 14 (e.g., the merchant account thereof) to settle the proxy transaction at a step T23.

Figure 13:
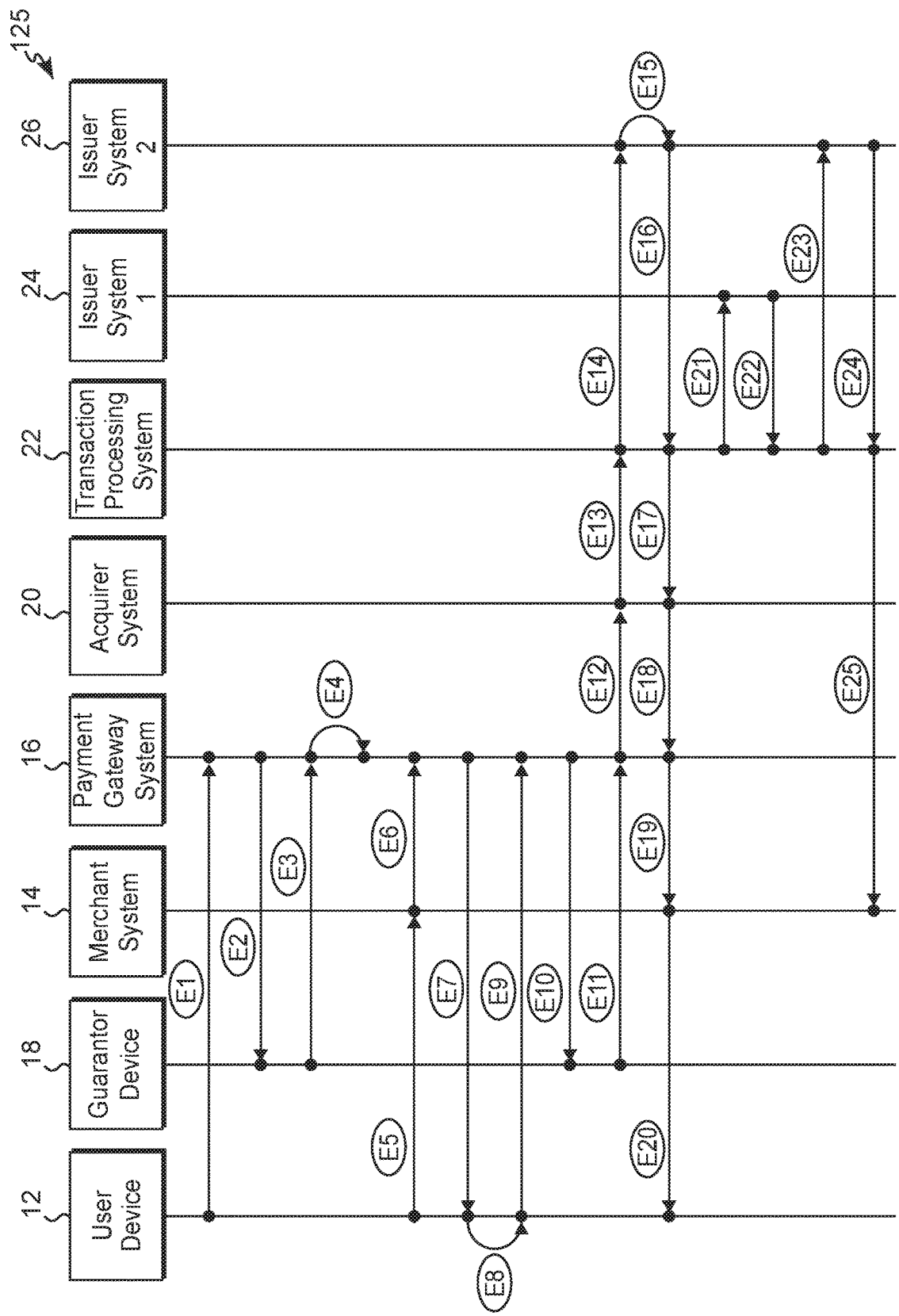
FIG. 13 shows a process flow diagram of a method for processing a payment transaction via a proxy guarantor according to some non-limiting embodiments or aspects.

Referring to FIG. 13, a method 125 is shown for processing a payment transaction via a proxy guarantor using the guarantor's payment account according to some non-limiting embodiments or aspects. With respect to steps E1-E21, each step is identical to each of steps T1-T21, respectively, described in connection with FIG. 12.

At a step E22, the issuer system 24 of the user's payment device may determine the settlement decision and generate and communicate a settlement response to the transaction processing system 22. In this non-limiting example, the settlement decision is to decline the transaction, such that the settlement response may include a data field including the payment decline indicator.

In response to receiving the settlement response including the payment decline indicator, at a step E23, the transaction processing system 22 may communicate the second settlement request to the issuer system 26 of the guarantor's payment device (e.g., the guarantor account thereof). At a step E24-E25, the transaction processing system 22 may transfer funds from the issuer system 26 of the guarantor's payment device (e.g., the guarantor account thereof) to the merchant system 14 (e.g., the merchant account thereof) to settle the proxy transaction.

Figure 14:
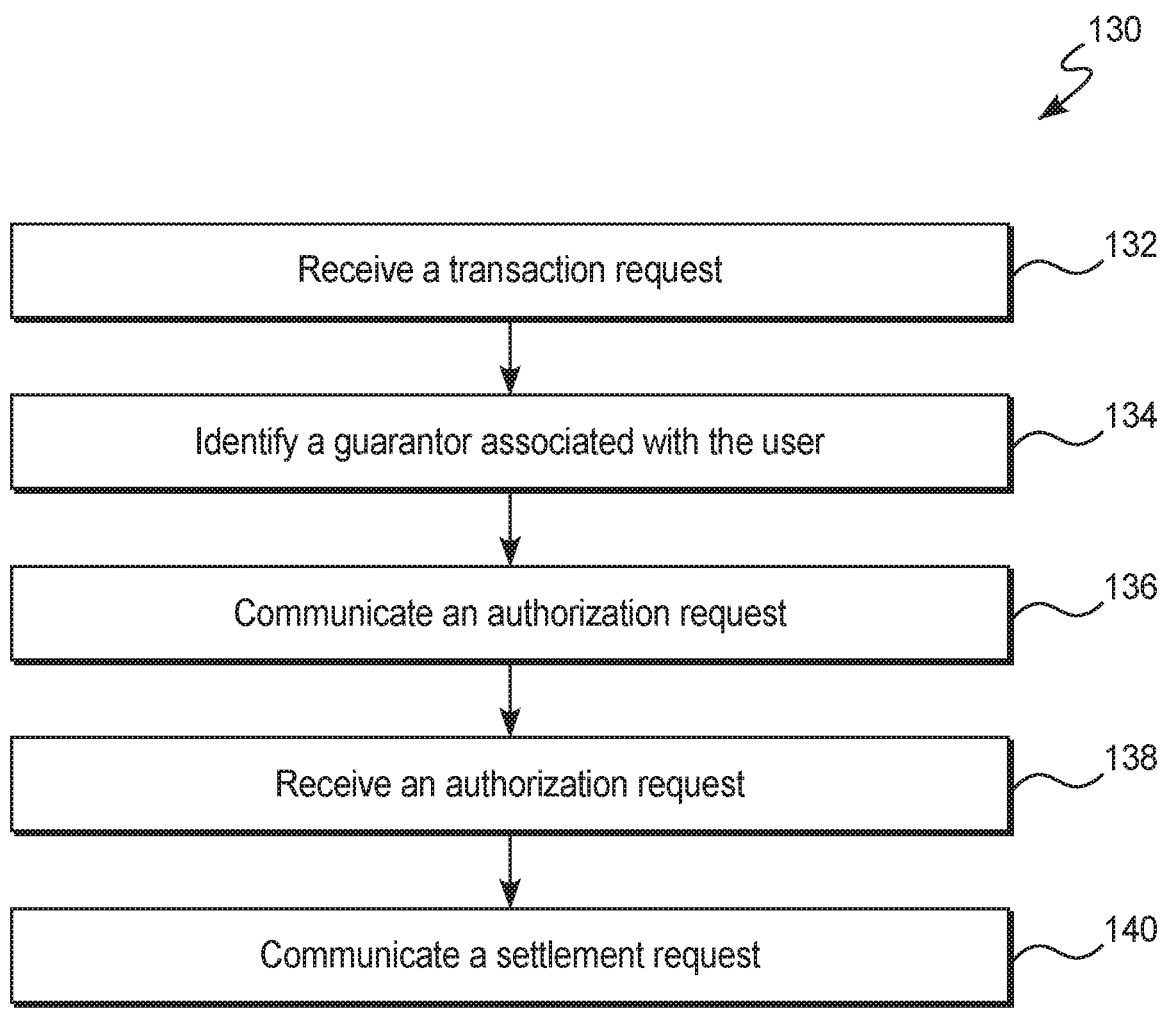
FIG. 14 shows a step diagram of a method for processing a payment transaction via a proxy guarantor according to some non-limiting embodiments or aspects.

Referring to FIG. 14, a method 130 is shown for processing a payment transaction via a proxy guarantor according to some non-limiting embodiments or aspects. At a step 132, the payment gateway system 16, the acquirer system 20, and/or the transaction processing system 22 may receive a transaction request associated with a payment transaction between a user and a merchant for a transaction amount. The transaction request may include payment device data associated with a payment device of the user, which is of a payment type not accepted by the merchant. The transaction request may include an indicator configured to cause the payment transaction to be processed as a proxy guarantor transaction.

With continued reference to FIG. 14, at a step 134, the payment gateway system 16, the acquirer system 20, and/or the transaction processing system 22 may identify at least one guarantor associated with the user. The at least one guarantor is associated with a payment device associated with a payment type accepted by the merchant.

At a step 136, the payment gateway system 16, the acquirer system 20, and/or the transaction processing system 22 may communicate an authorization request to an issuer system associated with the payment device of the guarantor to cause the issuer system associated with the payment device of the guarantor to authorize the payment transaction. At a step 138, the payment gateway system 16, the acquirer system 20, and/or the transaction processing system 22 may receive an authorization response from the issuer system associated with the payment device of the guarantor. The authorization response may include a payment transaction approval indicator (e.g., an approval indicator).

At a step 140, the payment gateway system 16, the acquirer system 20, and/or the transaction processing system 22 may communicate a settlement request to an issuer system associated with the payment device of the user.

In a further, non-limiting embodiment or aspect, a computer program product for processing a payment transaction via a proxy guarantor includes at least one non-transitory computer readable medium including program instructions that, when executed by at least one processor, cause the at least one processor to execute one of the previously-described methods. The at least one processor may include at least one of the following: the merchant system 14, the payment gateway system 16, the acquirer system 20, the transaction processing system 22, the issuer system 24 of the user's payment device, and the issuer system 26 of the guarantor's payment device.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for processing a payment transaction via a proxy guarantor, comprising:
   receiving, with at least one processor, a transaction request associated with a payment transaction between a user and a merchant for a transaction amount, the transaction request comprising: at least one data field comprising payment device data associated with a payment device of the user, the payment device associated with a payment type not accepted by the merchant; and a data field comprising an indicator causing the payment transaction to be processed as a proxy guarantor transaction;
   in response to identifying the user and the indicator from the transaction request, automatically identifying, with at least one processor, at least one guarantor associated with the user, wherein the at least one guarantor is associated with a payment device associated with a payment type accepted by the merchant;
   in response to identifying the at least one guarantor, generating and communicating, with at least one processor, an approval request to a computing device associated with the at least one guarantor during processing of the payment transaction to cause the computing device associated with the at least one guarantor to approve or decline being used to guarantee the payment transaction;
   receiving, with at least one processor, an approval response comprising a data field comprising an acceptance indicator during processing of the payment transaction;
   in response to receiving the acceptance indicator, generating and communicating, with at least one processor, an authorization request to an issuer system associated with the payment device of the guarantor to cause the issuer system associated with the payment device of the guarantor to authorize the payment transaction;
   receiving, with at least one processor, an authorization response from the issuer system associated with the payment device of the guarantor, the authorization response comprising a data field comprising a payment transaction approval indicator;
   in response to receiving the payment transaction approval indicator, generating and communicating, with at least one processor, a hold request to the issuer system associated with the payment device of the guarantor to cause the issuer system associated with the payment device of the guarantor to place a hold on an account of the guarantor for at least a portion of the transaction amount; and
   generating and communicating, with at least one processor, a settlement request to an issuer system associated with the payment device of the user.

2. The method of claim 1, further comprising:
   receiving, with at least one processor, a settlement response from the issuer system associated with the payment device of the user, wherein the settlement response comprises a payment decline indicator; and
   in response to receiving the settlement response, communicating, with at least one processor, a second settlement request to the issuer system associated with the payment device of the guarantor.

3. The method of claim 1, further comprising:
   receiving, with at least one processor, a settlement response from the issuer system associated with the payment device of the user, wherein the settlement response comprises a payment approval indicator;
   in response to receiving the settlement response, foregoing communicating for the payment transaction any settlement request to the issuer system associated with the payment device of the guarantor; and
   generating and communicating, with at least one processor, a hold removal message to the issuer system associated with the payment device of the guarantor to cause the issuer system associated with the payment device of the guarantor to remove the hold on the account of the guarantor.

4. The method of claim 1, further comprising:
   prior to receipt of the transaction request, receiving, with at least one processor, at least one guarantor on-boarding request comprising guarantor data associated with a guarantor; and
   based on the guarantor on-boarding request, associating, with at least one processor, the guarantor with a user; and
   storing, with at least one processor, the guarantor data in association with the user in a guarantor database.

5. The method of claim 1, wherein identifying at least one guarantor associated with the user comprises:
   communicating, with at least one processor, a guarantor selection request comprising at least one guarantor associated with the user to a computing device associated with the user; and
   receiving, with at least one processor, a guarantor selection response identifying at least one guarantor associated with the user to be used for processing the proxy guarantor transaction.

6. The method of claim 5, wherein the guarantor selection response identifies a plurality of guarantors associated with the user to be used for processing the proxy guarantor transaction.

7. The method of claim 5, further comprising:
   in response to receiving the guarantor selection response, communicating, with at least one processor, the approval request.

8. A system for processing a payment transaction via a proxy guarantor, comprising at least one processor programmed or configured to:
   receive a transaction request associated with a payment transaction between a user and a merchant for a transaction amount, the transaction request comprising: at least one data field comprising payment device data associated with a payment device of the user, the payment device associated with a payment type not accepted by the merchant; and a data field comprising an indicator causing the payment transaction to be processed as a proxy guarantor transaction;

in response to identifying the user and the indicator from the transaction request, automatically identify at least one guarantor associated with the user, wherein the at least one guarantor is associated with a payment device associated with a payment type accepted by the merchant;

in response to identifying the at least one guarantor, generate and communicate an approval request to a computing device associated with the at least one guarantor during processing of the payment transaction to cause the computing device associated with the at least one guarantor to approve or decline being used to guarantee the payment transaction;

receive an approval response comprising a data field comprising an acceptance indicator during processing of the payment transaction;

in response to receiving the acceptance indicator, generate and communicate an authorization request to an issuer system associated with the payment device of the guarantor to cause the issuer system associated with the payment device of the guarantor to authorize the payment transaction;

receive an authorization response from the issuer system associated with the payment device of the guarantor, the authorization response comprising a data field comprising a payment transaction approval indicator;

in response to receiving the payment transaction approval indicator, generate and communicate a hold request to the issuer system associated with the payment device of the guarantor to cause the issuer system associated with the payment device of the guarantor to place a hold on an account of the guarantor for at least a portion of the transaction amount; and generate and communicate a settlement request to an issuer system associated with the payment device of the user.

9. The system of claim 8, wherein the at least one processor is programmed or configured to:
receive a settlement response from the issuer system associated with the payment device of the user, wherein the settlement response comprises a payment decline indicator; and
in response to receiving the settlement response, communicate a second settlement request to the issuer system associated with the payment device of the guarantor.

10. The system of claim 8, wherein the at least one processor is programmed or configured to:
receive a settlement response from the issuer system associated with the payment device of the user, wherein the settlement response comprises a payment approval indicator;
in response to receiving the settlement response, forego communicating for the payment transaction any settlement request to the issuer system associated with the payment device of the guarantor; and
generate and communicate a hold removal message to the issuer system associated with the payment device of the guarantor to cause the issuer system associated with the payment device of the guarantor to remove the hold on the account of the guarantor.

11. The system of claim 8, wherein the at least one processor is programmed or configured to:
prior to receipt of the transaction request, receive at least one guarantor on-boarding request comprising guarantor data associated with a guarantor; and
based on the guarantor on-boarding request, associate the guarantor with a user; and
store the guarantor data in association with the user in a guarantor database.

12. The system of claim 8, wherein identifying at least one guarantor associated with the user comprises:
communicating, with at least one processor, a guarantor selection request comprising at least one guarantor associated with the user to a computing device associated with the user; and
receiving, with at least one processor, a guarantor selection response identifying at least one guarantor associated with the user to be used for processing the proxy guarantor transaction.

13. The system of claim 12, wherein the guarantor selection response identifies a plurality of guarantors associated with the user to be used for processing the proxy guarantor transaction.

14. The system of claim 12, wherein the at least one processor is programmed or configured to:
in response to receiving the guarantor selection response, communicate the approval request.

15. A computer program product for processing a payment transaction via a proxy guarantor, the computer program product comprising at least one non-transitory computer-readable medium including one or more instructions that, when executed by at least one processor, cause the at least one processor to:
receive a transaction request associated with a payment transaction between a user and a merchant for a transaction amount, the transaction request comprising: at least one data field comprising payment device data associated with a payment device of the user, the payment device associated with a payment type not accepted by the merchant; and a data field comprising an indicator causing the payment transaction to be processed as a proxy guarantor transaction;
in response to identifying the user and the indicator from the transaction request, automatically identify at least one guarantor associated with the user, wherein the at least one guarantor is associated with a payment device associated with a payment type accepted by the merchant;
in response to identifying the at least one guarantor, generate and communicate an approval request to a computing device associated with the at least one guarantor during processing of the payment transaction to cause the computing device associated with the at least one guarantor to approve or decline being used to guarantee the payment transaction;
receive an approval response comprising a data field comprising an acceptance indicator during processing of the payment transaction;
in response to receiving the acceptance indicator, generate and communicate an authorization request to an issuer system associated with the payment device of the guarantor to cause the issuer system associated with the payment device of the guarantor to authorize the payment transaction;
receive an authorization response from the issuer system associated with the payment device of the guarantor, the authorization response comprising a data field comprising a payment transaction approval indicator;
in response to receiving the payment transaction approval indicator, generate and communicate a hold request to the issuer system associated with the payment device of the guarantor to cause the issuer system associated with the payment device of the guarantor to place a hold on an account of the guarantor for at least a portion of the transaction amount; and generate and communicate a settlement request to an issuer system associated with the payment device of the user.

16. The computer program product of claim 15, wherein the one or more instructions cause the at least one processor to:

receive a settlement response from the issuer system associated with the payment device of the user, wherein the settlement response comprises a payment decline indicator; and in response to receiving the settlement response, communicate a second settlement request to the issuer system associated with the payment device of the guarantor.

17. The computer program product of claim 15, wherein the one or more instructions cause the at least one processor to:

receive a settlement response from the issuer system associated with the payment device of the user, wherein the settlement response comprises a payment approval indicator;

in response to receiving the settlement response, forego communicating for the payment transaction any settlement request to the issuer system associated with the payment device of the guarantor; and generate and communicate a hold removal message to the issuer system associated with the payment device of the guarantor to cause the issuer system associated with the payment device of the guarantor to remove the hold on the account of the guarantor.

18. The computer program product of claim 15, wherein the one or more instructions cause the at least one processor to:

prior to receipt of the transaction request, receive at least one guarantor on-boarding request comprising guarantor data associated with a guarantor; and based on the guarantor on-boarding request, associate the guarantor with a user; and store the guarantor data in association with the user in a guarantor database.

19. The computer program product of claim 15, wherein identifying at least one guarantor associated with the user comprises:

communicating, with at least one processor, a guarantor selection request comprising at least one guarantor associated with the user to a computing device associated with the user; and receiving, with at least one processor, a guarantor selection response identifying at least one guarantor associated with the user to be used for processing the proxy guarantor transaction.

20. The computer program product of claim 19, wherein the one or more instructions cause the at least one processor to:

in response to receiving the guarantor selection response, communicate the approval request.

\* \* \* \* \*